(12) United States Patent
Kashiwagi et al.

(10) Patent No.: US 11,030,760 B2
(45) Date of Patent: Jun. 8, 2021

(54) IMAGE PROCESSING DEVICE, RANGING DEVICE AND METHOD

(71) Applicant: KABUSHIKI KAISHA TOSHIBA, Tokyo (JP)

(72) Inventors: Masako Kashiwagi, Ageo Saitama (JP); Nao Mishima, Inagi Tokyo (JP); Takayuki Sasaki, Ota Tokyo (JP); Tatsuo Kozakaya, Kawasaki Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 103 days.

(21) Appl. No.: 16/543,692

(22) Filed: Aug. 19, 2019

(65) Prior Publication Data
US 2020/0294260 A1  Sep. 17, 2020

(30) Foreign Application Priority Data

Mar. 11, 2019  (JP) .............................. JP2019-043814

(51) Int. Cl.
G06K 9/00  (2006.01)
G06T 7/571  (2017.01)

(52) U.S. Cl.
CPC .... *G06T 7/571* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| 8,514,491 B2* | 8/2013 | Duparre | G02B 13/001 |
| | | | 359/618 |
| 9,749,532 B1* | 8/2017 | Hinkel | H04N 5/35572 |
| 2008/0174678 A1* | 7/2008 | Solomon | H04N 5/2254 |
| | | | 348/231.99 |
| 2008/0212838 A1* | 9/2008 | Frigerio | G06T 7/269 |
| | | | 382/107 |
| 2011/0242372 A1* | 10/2011 | Kosaka | H04N 9/045 |
| | | | 348/242 |

(Continued)

FOREIGN PATENT DOCUMENTS

| CN | 101545774 A | 9/2009 |
| JP | 2020-26990 A | 2/2020 |

OTHER PUBLICATIONS

Bando et al., "Extracting Depth and Matte using a Color-Filtered Aperture," ACM Transactions on Graphics (TOG), vol. 27, No. 5, 9 pages. (2008).

(Continued)

*Primary Examiner* — Shervin K Nakhjavan
(74) *Attorney, Agent, or Firm* — Finnegan, Henderson, Farabow, Garrett & Dunner, L.L.P.

(57) ABSTRACT

According to one embodiment, an image processing device includes storage and a processor. The storage stores a statistical model generated by learning bokeh produced in a first image affected by aberration of an optical system, the bokeh changing nonlinearly in accordance with a distance to a subject in the first image. The processor obtains a second image affected by the aberration of the optical system. The processor inputs the second image to the statistical model and obtains distance information indicating a distance to a subject in the second image.

16 Claims, 19 Drawing Sheets

(56) References Cited

U.S. PATENT DOCUMENTS

| | | | | |
|---|---|---|---|---|
| 2012/0044400 A1* | 2/2012 | Okada | ............... | H04N 5/23293 348/333.01 |
| 2012/0078586 A1* | 3/2012 | Alon | ............... | H04N 5/2254 703/1 |
| 2012/0242867 A1* | 9/2012 | Shuster | ............... | G01B 11/24 348/240.2 |
| 2014/0063234 A1* | 3/2014 | Nobayashi | ............... | H04N 7/18 348/135 |
| 2014/0152886 A1* | 6/2014 | Morgan-Mar | ............... | H04N 5/23229 348/349 |
| 2015/0138423 A1* | 5/2015 | Laroia | ............... | G02B 17/008 348/340 |
| 2015/0178970 A1* | 6/2015 | Pham | ............... | G06K 9/6256 382/190 |
| 2016/0093032 A1* | 3/2016 | Lei | ............... | G06T 11/00 382/264 |
| 2017/0184770 A1* | 6/2017 | Weichelt | ............... | H04N 5/225 |
| 2019/0244379 A1* | 8/2019 | Venkataraman | ............... | G06T 7/55 |
| 2020/0051264 A1 | 2/2020 | Mishima et al. | | |
| 2020/0265565 A1* | 8/2020 | Hwang | ............... | G06T 7/11 |

OTHER PUBLICATIONS

Carvalho et al., "Deep Depth from Defocus: how can defocus blur improve 3D estimation using dense neural networks?", (arXiv:1809.01567v2, pp. 1-18 (Sep. 6, 2018).

Moriuchi et al., "Depth from Asymmetric Defocus using Color-Filtered Aperture," SID 2017 Digest, 48:325-328 (Jun. 2, 2017).

Trouvé et al., "Passive depth estimation using chromatic aberration and a depth from defocus approach," Applied Optics, 52:7152-64 (Oct. 10, 2013).

\* cited by examiner

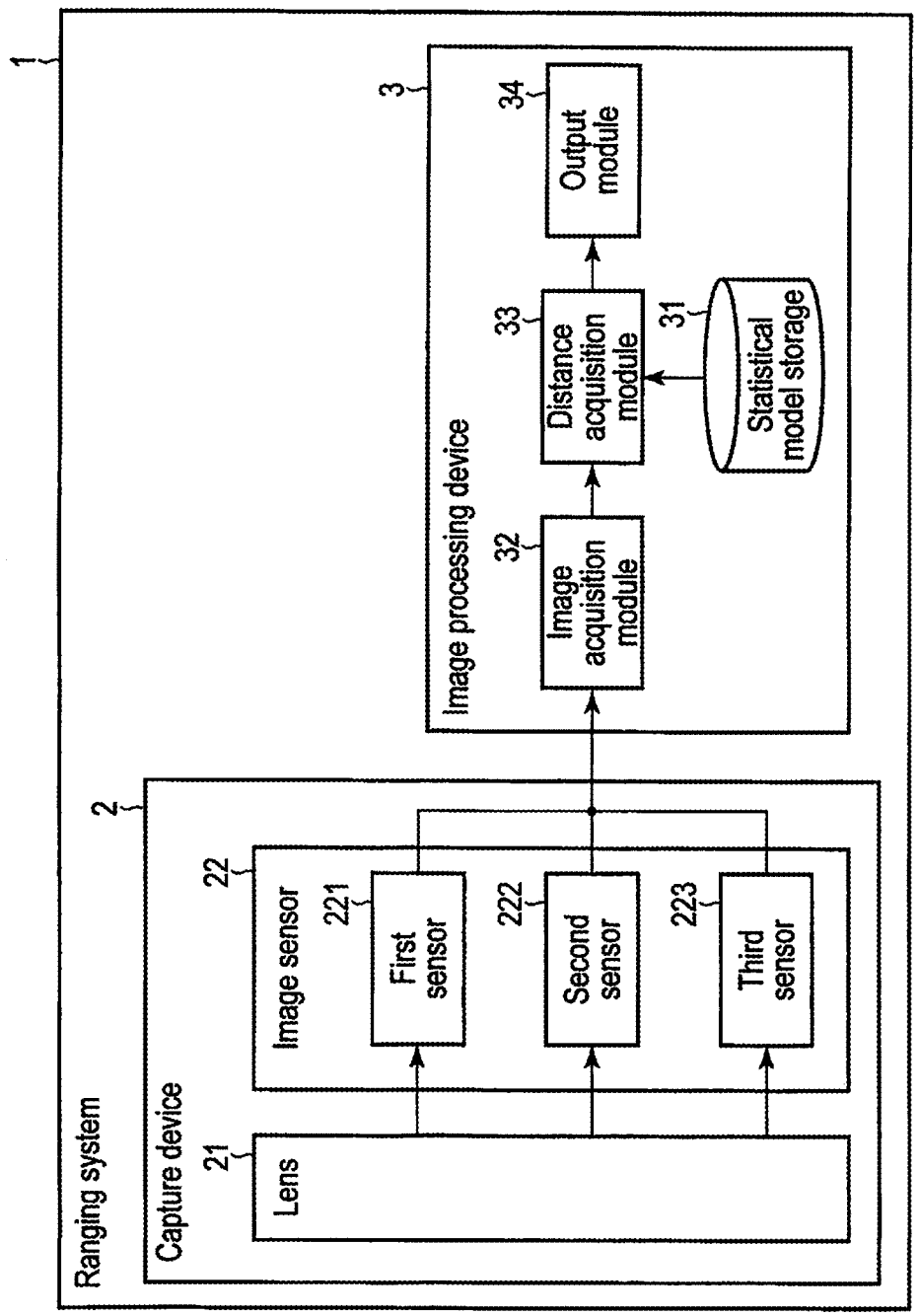
F I G. 1

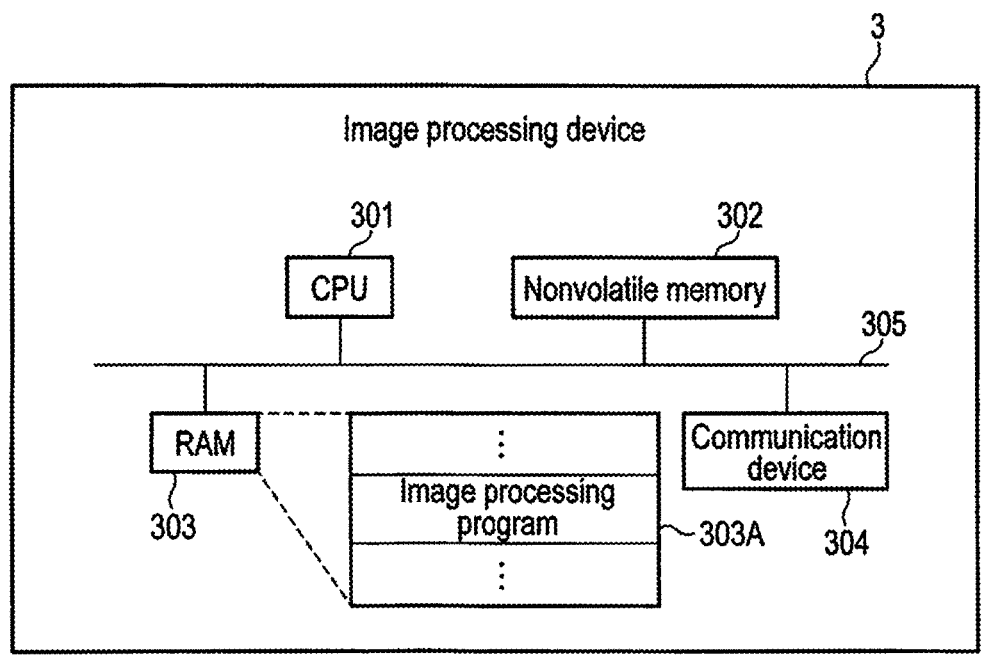
F I G. 2
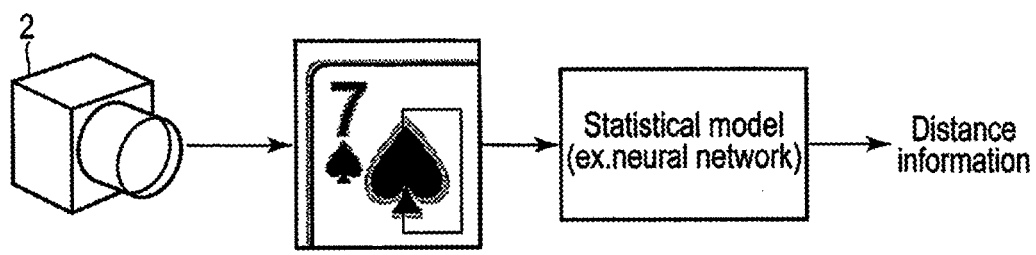
F I G. 3

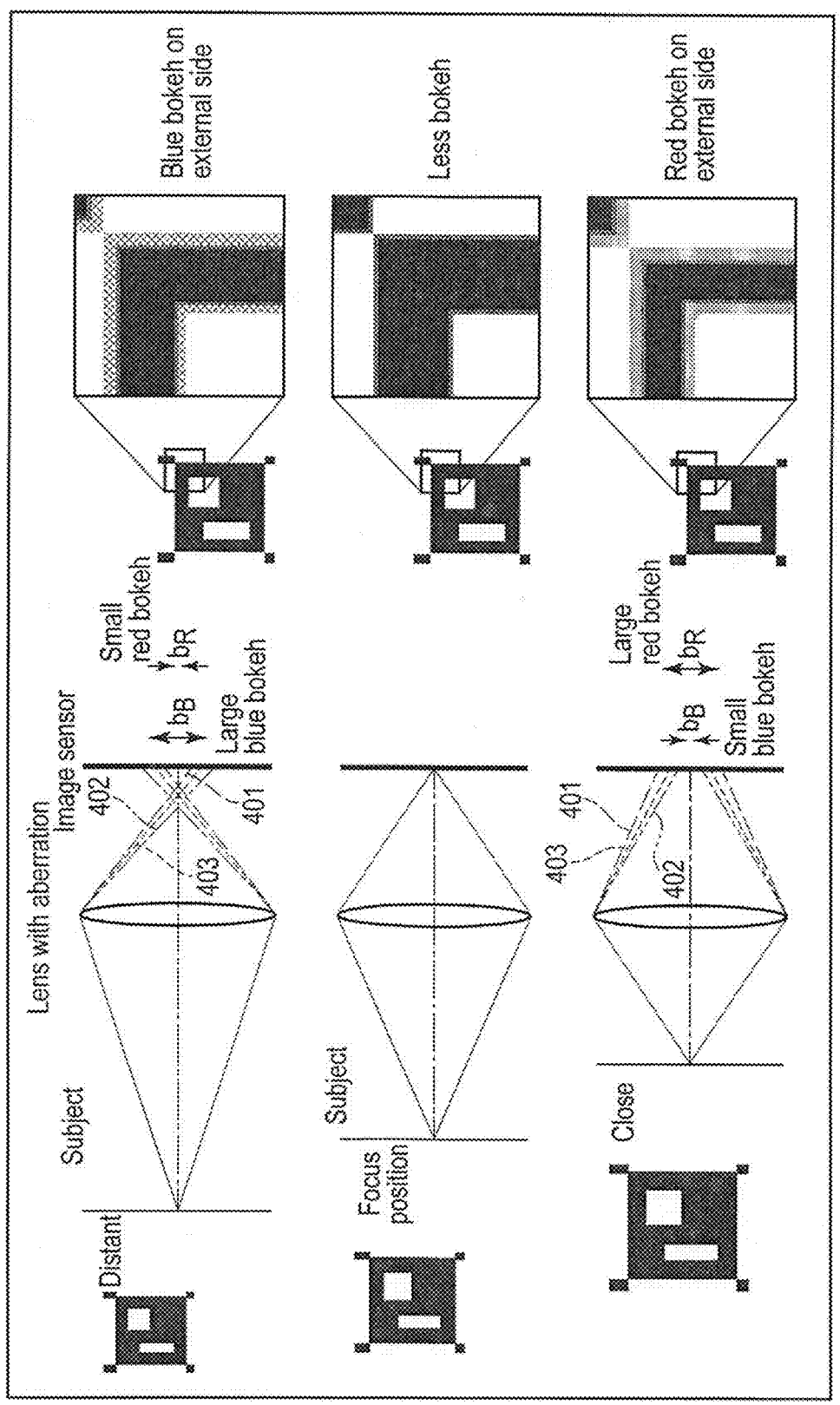
F I G. 4

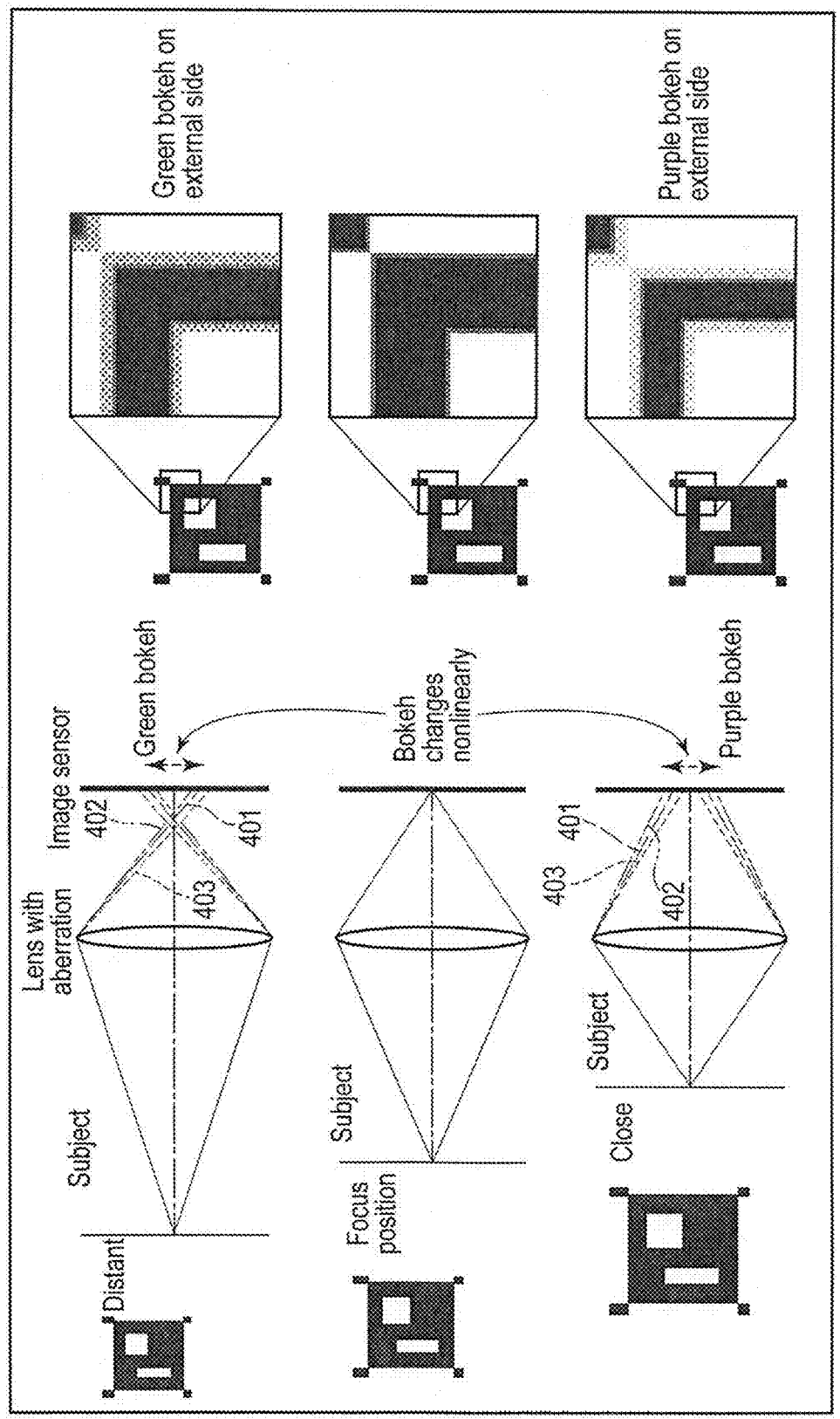
F I G. 5

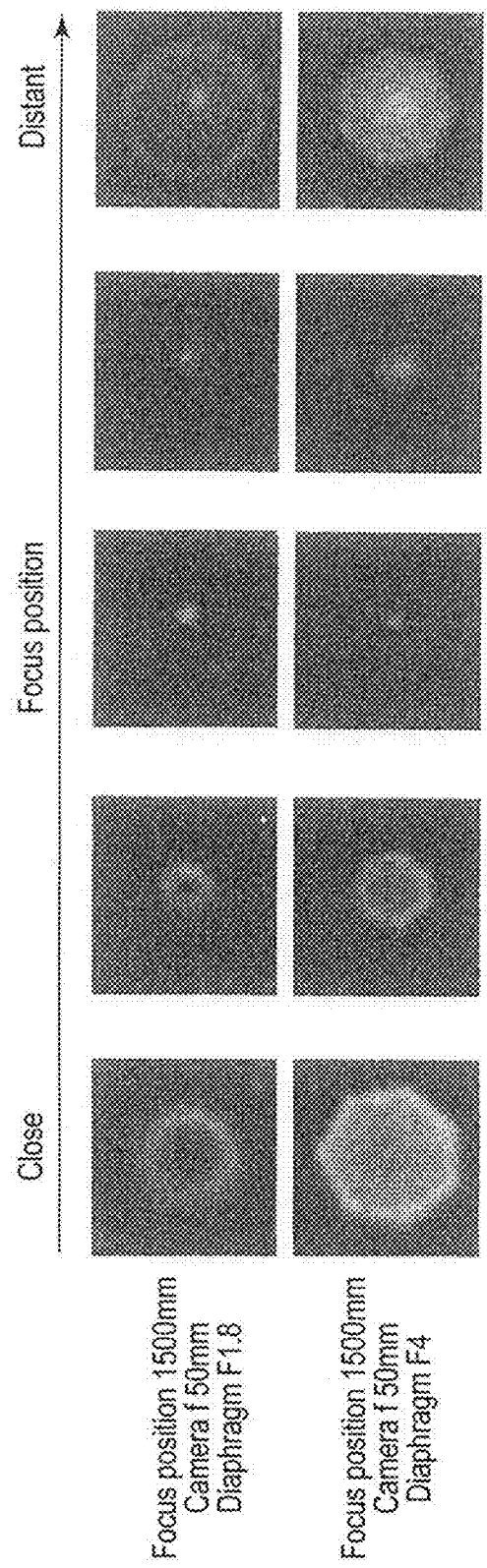
F I G. 6

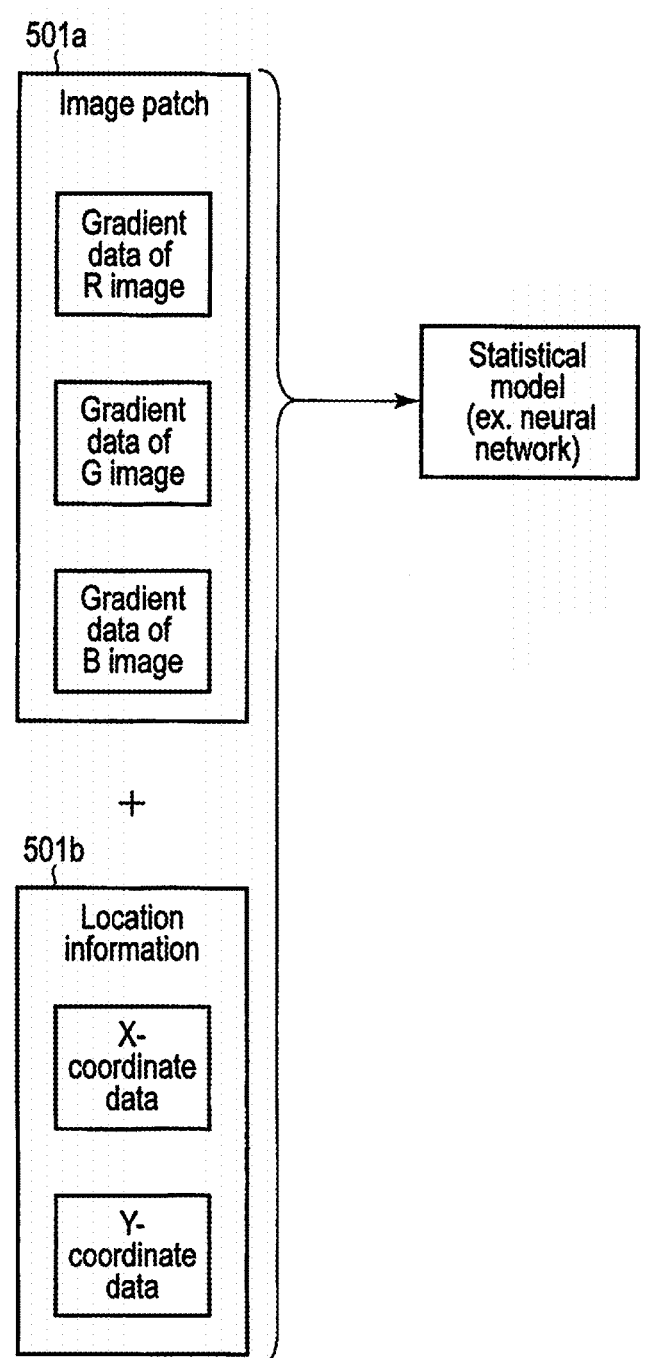
F I G. 14

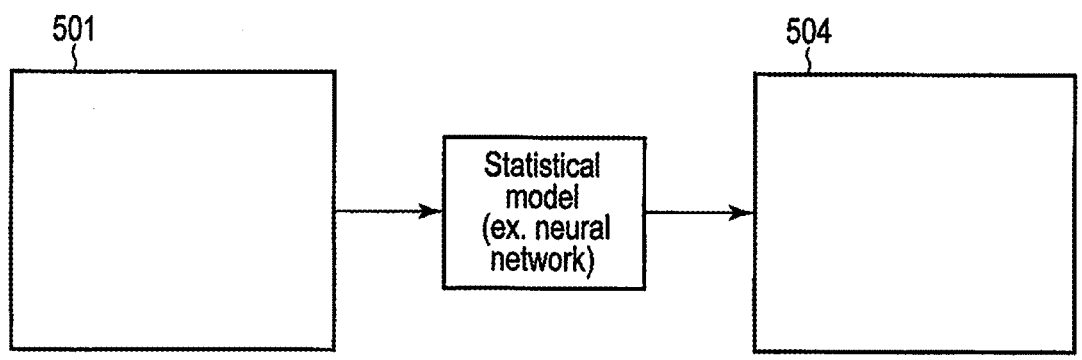
F I G. 15
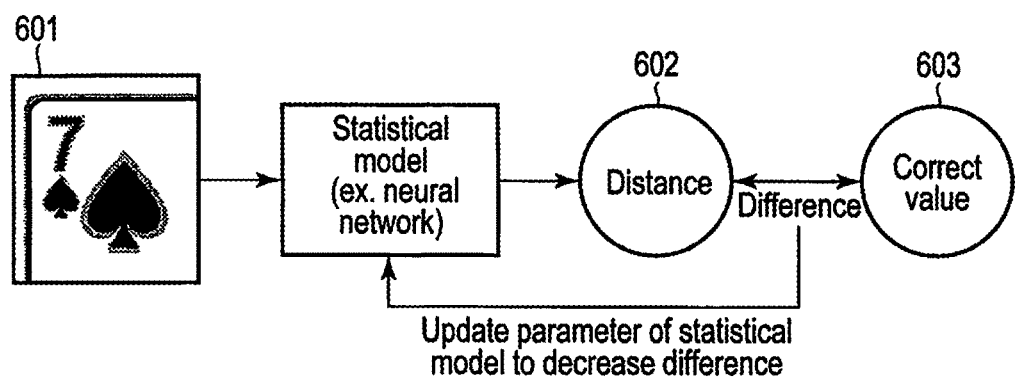
F I G. 16

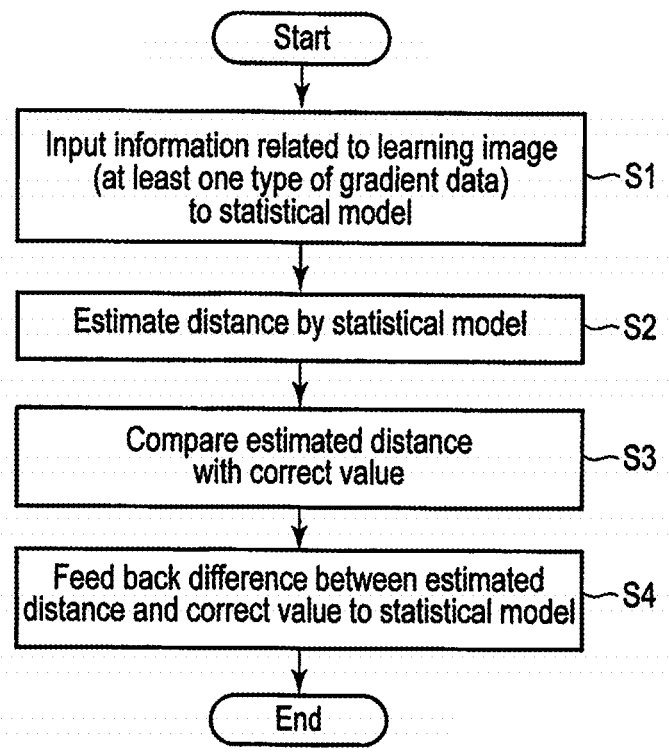
F I G. 18
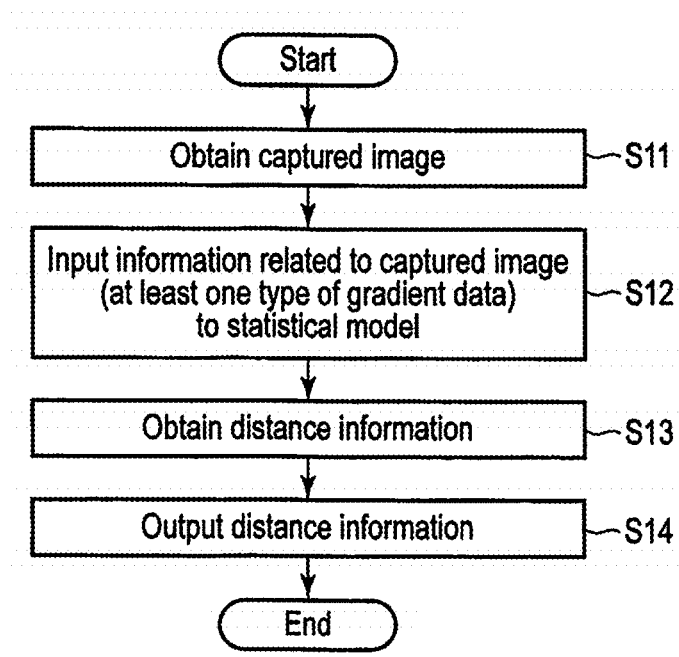
F I G. 19

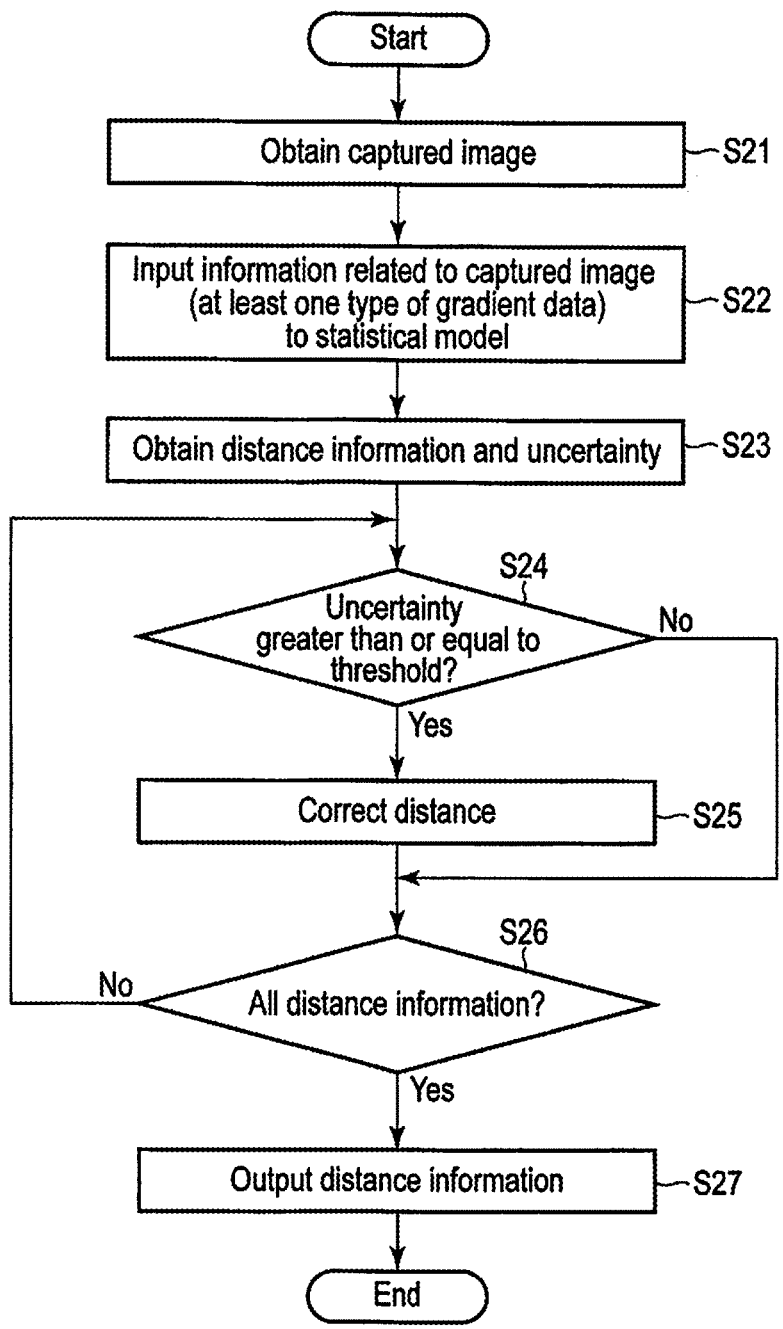
F I G. 22

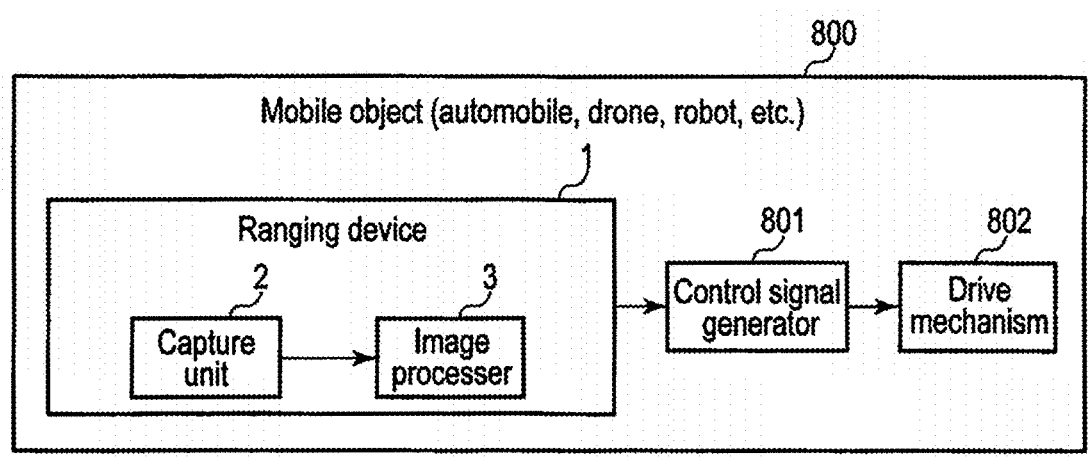
F I G. 23
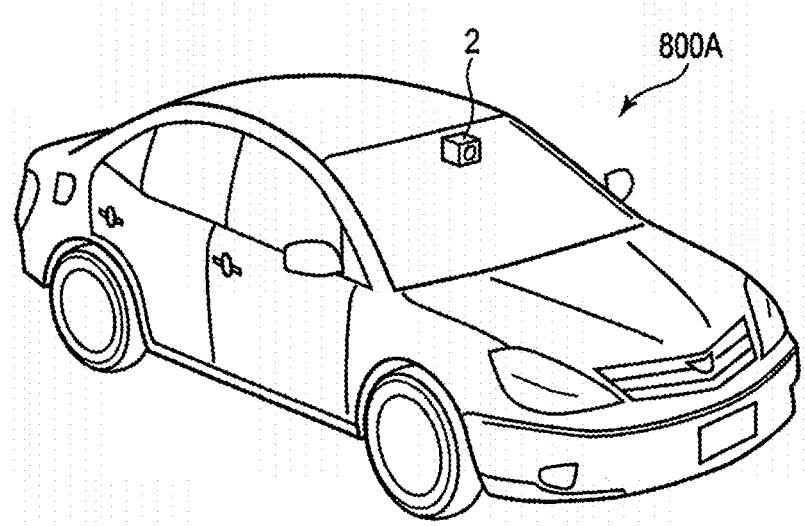
F I G. 24

IMAGE PROCESSING DEVICE, RANGING DEVICE AND METHOD

CROSS-REFERENCE TO RELATED APPLICATIONS

This application is based upon and claims the benefit of priority from Japanese Patent Application No. 2019-043814, filed Mar. 11, 2019, the entire contents of which are incorporated herein by reference.

FIELD

Embodiments described herein relate generally to an image processing device, a ranging device and a method.

BACKGROUND

In general, to obtain the distance to a subject, the use of images captured by two capture devices (cameras) or a stereo camera (compound eye camera) has been known. In recent years, a technology for obtaining the distance to a subject using an image captured by a single capture device (monocular camera) has been developed.

However, when a distance is obtained from an image captured by a single capture device, it is difficult to realize a high robustness.

BRIEF DESCRIPTION OF THE DRAWINGS

FIG. 1 shows an example of the configuration of a ranging system including an image processing device according to an embodiment.

FIG. 2 shows an example of the system configuration of the image processing device.

FIG. 3 is shown for explaining the outline of the operation of the ranging system.

FIG. 4 shows the relationship between the distance to a subject and the bokeh produced in an image by chromatic aberration when a single lens is used.

FIG. 5 shows the relationship between the distance to a subject and the bokeh produced in an image by chromatic aberration when an achromatic lens is used.

FIG. 6 shows the relationship between the size of the aperture of the diaphragm mechanism provided in a capture device and a PSF shape.

FIG. 14 shows an example of information input to a statistical model in the second method.

FIG. 15 is shown for explaining a third method for estimating a distance from a captured image.

FIG. 16 shows an example of the learning method of a statistical model.

FIG. 18 is a flowchart showing an example of the processing procedure for generating a statistical model.

FIG. 19 is a flowchart showing an example of the processing procedure of the image processing device when distance information is obtained from a captured image.

FIG. 22 is a flowchart showing an example of the processing procedure of the image processing device when distance information is obtained from a captured image.

FIG. 23 shows an example of the functional configuration of a mobile object including a ranging device.

FIG. 24 is shown for explaining a case where the mobile object is an automobile.

DETAILED DESCRIPTION

Figure 7:
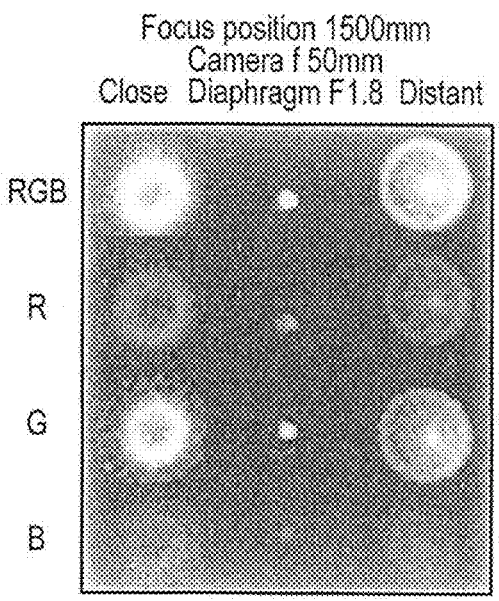
FIG. 7 shows an example of the PSF shape produced in the image of each channel.

Various embodiments will be described hereinafter with reference to the accompanying drawings.

In general, according to one embodiment, an image processing device includes storage and a processor. The storage stores a statistical model generated by learning bokeh produced in a first image affected by aberration of an optical system, the bokeh changing nonlinearly in accordance with a distance to a subject in the first image. The processor obtains a second image affected by the aberration of the optical system. The processor inputs the second image to the statistical model and obtains distance information indicating a distance to a subject in the second image.

FIG. 1 shows an example of the configuration of a ranging system including an image processing device according to the present embodiment. The ranging system 1 shown in FIG. 1 is used to capture an image and obtain (measure) the distance from the capture point to the subject using the captured image.

As shown in FIG. 1, the ranging system 1 includes a capture device 2 and an image processing device 3. In the present embodiment, the ranging system 1 includes the capture device 2 and the image processing device 3 as separate devices. However, the ranging system 1 may be realized as a single device (ranging device) in which the capture device 2 functions as a capture unit and the image processing device 3 functions as an image processor. The image processing device 3 may operate as, for example, a server which performs various kinds of cloud computing services.

The capture device 2 is used to capture various types of images. The capture device 2 includes a lens 21 and an image sensor 22. The lens 21 and the image sensor 22 are equivalent to the optical system (monocular camera) of the capture device 2. The optical system of the capture device 2 further includes, for example, a diaphragm mechanism (not shown) including an aperture for adjusting the amount of light taken in the optical system of the capture device 2 (in other words, the amount of entering light).

The light reflected on the subject enters the lens 21. The light which entered the lens 21 passes through the lens 21.

The light which passed through the lens 21 reaches the image sensor 22 and is received (detected) by the image sensor 22. The image sensor 22 generates an image consisting of a plurality of pixels by converting the received light into electric signals (photoelectric conversion).

The image sensor 22 is realized by, for example, a charge coupled device (CCD) image sensor or a complementary metal oxide semiconductor (CMOS) image sensor. The image sensor 22 includes, for example, a first sensor (R sensor) 221 which detects light having a red (R) wavelength band, a second sensor (G sensor) 222 which detects light having a green (G) wavelength band and a third sensor (B sensor) 223 which detects light having a blue (B) wavelength band. The image sensor 22 is capable of receiving light having corresponding wavelength bands by the first to third sensors 221 to 223 and generating sensor images (an R image, a G image and a B image) corresponding to the wavelength bands (color components). The image captured by the capture device 2 is a color image (RGB image) and includes an R image, a G image and a B image.

In the present embodiment, the image sensor 22 includes the first to third sensors 221 to 223. However, the image sensor 22 may be configured to include at least one of the first to third sensors 221 to 223. The image sensor 22 may include, for example, a sensor for generating a monochromatic image instead of the first to third sensors 221 to 223.

In the present embodiment, an image generated based on the light which passed through the lens 21 is an image affected by the aberration of the optical system (lens 21), and includes bokeh (defocus blur) produced by the aberration. The details of the bokeh produced in an image are described later.

The image processing device 3 shown in FIG. 1 includes, as functional structures, a statistical model storage 31, an image acquisition module 32, a distance acquisition module 33 and an output module 34.

In the statistical model storage 31, a statistical model used to obtain the distance to a subject from an image captured by the capture device 2 is stored. The statistical model stored in the statistical model storage 31 is generated by learning the bokeh produced in an image (first image) affected by the above aberration of the optical system and changing nonlinearly in accordance with the distance to the subject in the image. It should be noted that the statistical model may be generated by applying various types of known machine learning algorithm such as a neural network or random forests. The neural network applicable in the present embodiment may include, for example, a convolutional neural network (CNN), a totally-coupled neural network and a recursive neural network.

The image acquisition module 32 obtains an image (second image) captured by the capture device 2 from the capture device 2 (image sensor 22).

The distance acquisition module 33 uses an image obtained by the image acquisition module 32 and obtains distance information indicating the distance to the subject in the image. In this case, the distance acquisition module 33 inputs an image to the statistical model stored in the statistical model storage 31 to obtain distance information indicating the distance to the subject in the image.

For example, the output module 34 outputs the distance information obtained by the distance acquisition module 33 in a map form in which the distance information is positionally associated with an image. In this case, the output module 34 is capable of outputting image data consisting of pixels in which the distance indicated by distance information is a pixel value (in other words, the output module 34 is capable of outputting distance information as image data). When distance information is output as image data in this manner, for example, the image data can be displayed as a distance image indicating the distance by colors. For example, the distance information output by the output module 34 may be used to calculate the size of a subject in an image captured by the capture device 2.

FIG. 2 shows an example of the system configuration of the image processing device 3 shown in FIG. 1. The image processing device 3 includes a CPU 301, a nonvolatile memory 302, a RAM 303 and a communication device 304. The image processing device 3 further includes a bus 305 mutually connecting the CPU 301, the nonvolatile memory 302, the RAM 303 and the communication device 304.

The CPU 301 is a processor to control the operation of various components of the image processing device 3. The CPU 301 may be a single processor or include a plurality of processors. The CPU 301 executes various programs loaded from the nonvolatile memory 302 into the RAM 303. These programs include an operating system (OS) and various application programs. The application programs include an image processing program 303A to use an image captured by the capture device 2 and obtain the distance to a subject in the image from the capture device 2.

The nonvolatile memory 302 is a storage medium used as an auxiliary storage device. The RAM 303 is a storage medium used as a main storage device. FIG. 2 shows only the nonvolatile memory 302 and the RAM 303. However, the image processing device 3 may include another storage device such as a hard disk drive (HDD) or a solid stage drive (SDD).

In the present embodiment, the statistical model storage 31 shown in FIG. 1 is realized by, for example, the nonvolatile memory 302 or another storage device.

In the present embodiment, some or all of the image acquisition module 32, the distance acquisition module 33 and the output module 34 are realized by causing the CPU 301 (in other words, the computer of the image processing device 3) to execute the image processing program 303A, in other words, by software. The image processing program 303A may be stored in a computer-readable storage medium and distributed, or may be downloaded into the image processing device 3 through a network. It should be noted that some or all of the modules 32 to 34 may be realized by hardware such as an integrated circuit (IC) or a combination of software and hardware.

The communication device 304 is a device configured to perform wired communication or wireless communication. The communication device 304 includes a transmitter which transmits a signal and a receiver which receives a signal. For example, the communication device 304 communicates with an external device via a network and communicates with an external device present around the communication device 304. The external device includes the capture device 2. In this case, the image processing device 3 receives an image from the capture device 2 via the communication device 304.

Although omitted in FIG. 2, the image processing device 3 may further include an input device such as a mouse or keyboard, and a display device such as a display.

Now, this specification explains the outline of the operation of the ranging system 1 of the present embodiment with reference to FIG. 3.

In the ranging system 1, the capture device 2 (image sensor 22) generates an image affected by the aberration of the optical system (lens 21) as described above.

The image processing device 3 (image acquisition module 32) obtains an image generated by the capture device 2 and inputs the image to the statistical model stored in the statistical model storage 31.

The image processing device 3 (distance acquisition module 33) uses the statistical model and obtains distance information indicating the distance to a subject in the image input to the statistical model.

In this way, in the present embodiment, distance information can be obtained from an image captured by the capture device 2 using a statistical model.

In the present embodiment, an image captured by the capture device 2 includes bokeh caused by the aberration of the optical system of the capture device 2 (lens aberration) as stated above.

The bokeh produced in an image is explained below. In the present embodiment, this specification mainly explains chromatic aberration regarding the bokeh caused by the aberration of the optical system of the capture device 2.

FIG. 4 shows the relationship between the distance to a subject and the bokeh produced in an image by chromatic aberration. In the following explanation, a position in focus in the capture device 2 is referred to as a focus position.

The refractive index of light when light passes through the lens 21 having aberration differs depending on the wavelength band. Thus, for example, when the position of the subject is out of the focus position, light of various wavelength bands is not concentrated at one point and reaches different points. This emerges as chromatic aberration (bokeh) on an image.

The upper stage of FIG. 4 shows a case where the position of the subject is more distant from the capture device 2 (image sensor 22) than the focus position (in other words, the position of the subject is on the rear side of the focus position).

In this case, regarding light 401 having a red wavelength band, an image including comparatively small bokeh $b_R$ is generated in the image sensor 22 (first sensor 221). Regarding light 402 having a blue wavelength band, an image including comparatively large bokeh $b_B$ is generated in the image sensor 22 (third sensor 223). Regarding light 403 having a green wavelength band, an image including bokeh whose size is intermediate between bokeh $b_R$ and bokeh $b_B$ is generated. Thus, in an image captured in a state in which the position of the subject is more distant from the capture device 2 than the focus position, blue bokeh is observed on the external side of the subject in the image.

The lower stage of FIG. 4 shows a case where the position of the subject is closer to the capture device 2 (image sensor 22) than the focus position (in other words, the position of the subject is on the capture device 2 side with respect to the focus position).

In this case, regarding light 401 having a red wavelength band, an image including comparatively large bokeh $b_R$ is generated in the image sensor 22 (first sensor 221). Regarding light 402 having a blue wavelength band, an image including comparatively small bokeh $b_B$ is generated in the image sensor 22 (third sensor 223). Regarding light 403 having a green wavelength band, an image including bokeh whose size is intermediate between bokeh $b_R$ and bokeh $b_B$ is generated. Thus, in an image captured in a state in which the position of the subject is closer to the capture device 2 than the focus position, red bokeh is observed on the external side of the subject in the image.

In the example of FIG. 4, the lens 21 is simply a single lens. However, in general, for example, a lens to which chromatic aberration correction has been applied (hereinafter, referred to as an achromatic lens) may be used in the capture device 2. The achromatic lens is a combination of a convex lens element with low dispersion and a concave lens element with high dispersion, and includes the fewest lens elements as a lens which corrects chromatic aberration.

FIG. 5 shows the relationship between the distance to a subject and the bokeh produced in an image by chromatic aberration when the above achromatic lens is used for the lens 21. The achromatic lens is designed to bring a blue wavelength and a red wavelength into focus. However, chromatic aberration cannot be completely eliminated. Thus, when the position of the subject is more distant from the capture device 2 than the focus position, green bokeh is produced. When the position of the subject is closer to the capture device 2 than the focus position, purple bokeh is produced.

The middle stage of FIG. 4 shows a case where the position of the subject is matched with the focus position with respect to the capture device 2 (image sensor 22). In this case, an image having less bokeh is generated in the image sensor 22 (first to third sensors 221 to 223).

As described above, the diaphragm mechanism is provided in the optical system of the capture device 2. The shape of the bokeh produced in an image captured by the capture device 2 differs depending on the size of the aperture of the diaphragm mechanism. The shape of bokeh is referred to as a point spread function (PSF) shape, and indicates the diffusion distribution of light generated when a point source is captured.

FIG. 6 shows the relationship between the size of the aperture of the diaphragm mechanism provided in the capture device 2 and the PSF shape.

The upper stage of FIG. 6 shows the PSF shapes produced in the images captured by the capture device 2 having a focus position of 1500 mm, a camera lens focal length of 50 mm, and an F-number (diaphragm) of F1.8. The PSF shapes are arranged from the left to right side as the distance from the subject to the capture device 2 increases. The lower stage of FIG. 6 shows the PSF shapes produced in the images captured by the capture device 2 having a focus position of 1500 mm, a camera lens focal length of 50 mm and an F-number (diaphragm) of F4. The PSF shapes are arranged from the left to right side as the distance from the subject to the capture device 2 increases. In FIG. 6, the middle shapes of the upper and lower stages indicate the PSF shapes in which the position of the subject is matched with the focus position.

The F-number is a numerical conversion of the amount of light taken into the capture device 2 (optical system). The amount of light taken into the capture device 2 increases (in other words, the aperture is larger) with increasing F-number.

In FIG. 6, the PSF shapes shown at corresponding positions in the upper and lower stages are the PSF shapes produced when the position of the subject with respect to the capture device 2 is the same as each other. However, even when the position of the subject is the same as each other, the PSF shape of the upper stage (the PSF shape produced in the image captured by the capture device 2 having an F-number of F1.8) is different from the PSF shape of the lower stage (the PSF shape produced in the image captured by the capture device 2 having an F-number of F4).

Moreover, as shown in the leftmost PSF shapes and the rightmost PSF shapes in FIG. 6, for example, even if the distance from the position of the subject to the focus position is substantially the same as each other, the PSF shape differs between when the position of the subject is closer to the capture device 2 than the focus position and when the position of the subject is more distant from the capture device 2 than the focus position.

Figure 8:
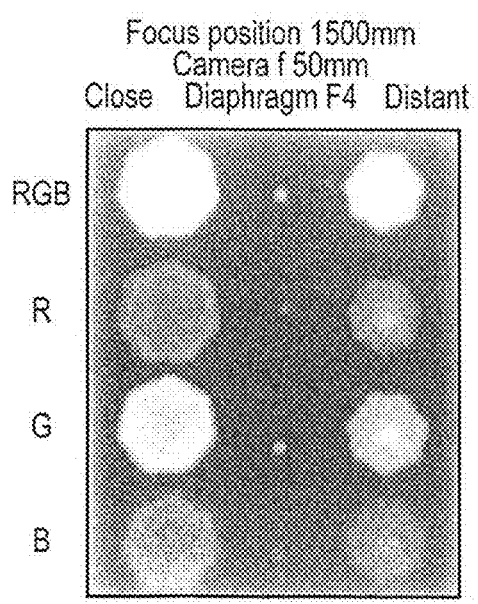
FIG. 8 shows another example of the PSF shape produced in the image of each channel.

The phenomenon in which the PSF shape differs depending on the size of the aperture of the diaphragm mechanism and the position of the subject with respect to the capture device 2 as described above is also caused in each channel (an RGB image, an R image, a G image and a B image). FIG. 7 shows the PSF shapes produced in the images of the channels captured by the capture device 2 having a focus position of 1500 mm, a camera lens focal length of 50 mm and an F-number of F1.8. In FIG. 7, the PSF shapes are separated based on whether the position of the subject is closer to the capture device 2 than the focus position (on the capture device 2 side) or more distant from the capture device 2 than the focus position (on the rear side). FIG. 8 shows the PSF shapes produced in the images of the channels captured by the capture device 2 having a focus position of 1500 mm, a camera lens focal length of 50 mm and an F-number of F4. In FIG. 8, the PSF shapes are separated based on whether the position of the subject is closer to the capture device 2 than the focus position or more distant from the capture device 2 than the focus position.

The image processing device 3 (ranging system 1) of the present embodiment obtains the distance to a subject from an image, using the statistical model generated in consideration of bokeh (the color, size and shape) changing nonlinearly in accordance with the distance to the subject (in other words, the position of the subject with respect to the capture device 2) in the image as described above. In the present embodiment, the bokeh changing nonlinearly includes, for example, the bokeh produced by the chromatic aberration of the optical system of the capture device 2 as explained above in FIG. 4 and FIG. 5 and the bokeh produced based on the size of the aperture of the diaphragm mechanism for adjusting the amount of light taken into the optical system of the capture device 2 as explained in FIG. 6 to FIG. 8.

Figure 9:
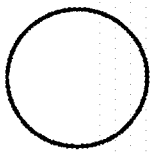
FIG. 9 shows the relationship between the non-linearity of the PSF shape and the shape of the aperture of the diaphragm mechanism.

Furthermore, the PSF shape differs depending on the shape of the aperture of the diaphragm mechanism. FIG. 9 shows the relationship between the non-linearity (asymmetry property) of the PSF shape and the shape of the aperture of the diaphragm mechanism. The above non-linearity of the PSF shape is easily caused when the shape of the aperture of the diaphragm mechanism is other than a circle. In particular, the non-linearity of the PSF shape is more easily caused when the shape of the aperture is an odd-gon, or an even-gon provided asymmetrically with respect to the horizontality or perpendicular line of the image sensor.

In the present embodiment, when the focus position of the capture device 2 is fixed, the light which passed through the lens 21 has a respondence shape of a point spread function (PSF) which changes depending on the distance to a subject. An image is generated by detecting this light by the image sensor 22.

Figure 10:
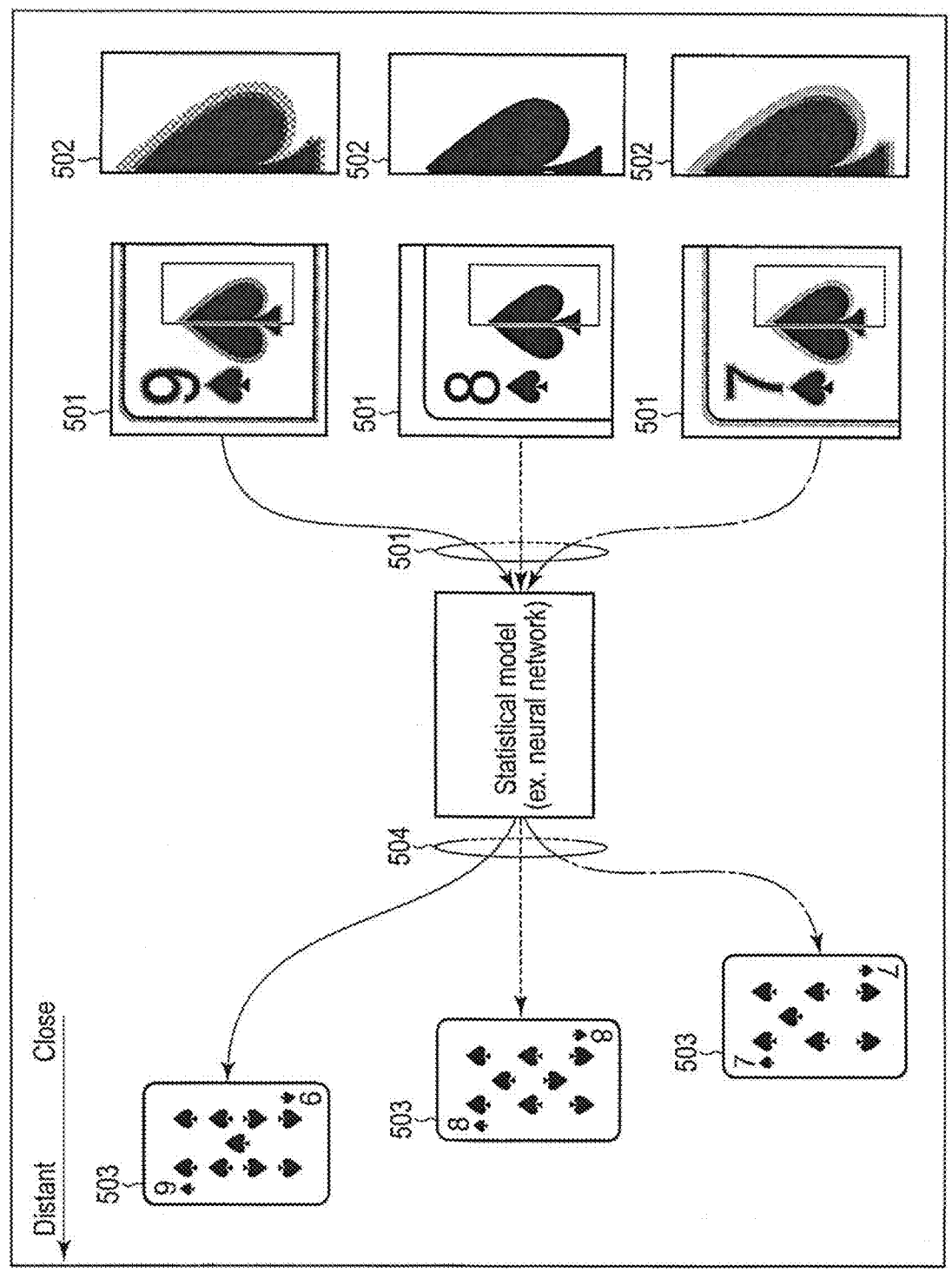
FIG. 10 shows the outline of the operation for obtaining distance information.

FIG. 10 shows the outline of the operation for obtaining distance information in the present embodiment. In the following explanation, an image captured by the capture device 2 to obtain distance information (the distance to a subject) is referred to as a captured image.

The bokeh (bokeh information) 502 produced in the captured image 501 shown in FIG. 10 is a physical clue to the distance to a subject 503. Specifically, the color of the bokeh, and the size and shape regarding the PSF are clues to the distance to the subject 503.

The image processing device 3 (distance acquisition module 33) of the present embodiment estimates the distance 504 to the subject 503 by analyzing the bokeh 502 produced in the captured image 501 as a physical clue with a statistical model.

Now, this specification explains an example of a method for estimating the distance based on a captured image using a statistical model. Here, first to third methods are explained.

Figure 11:
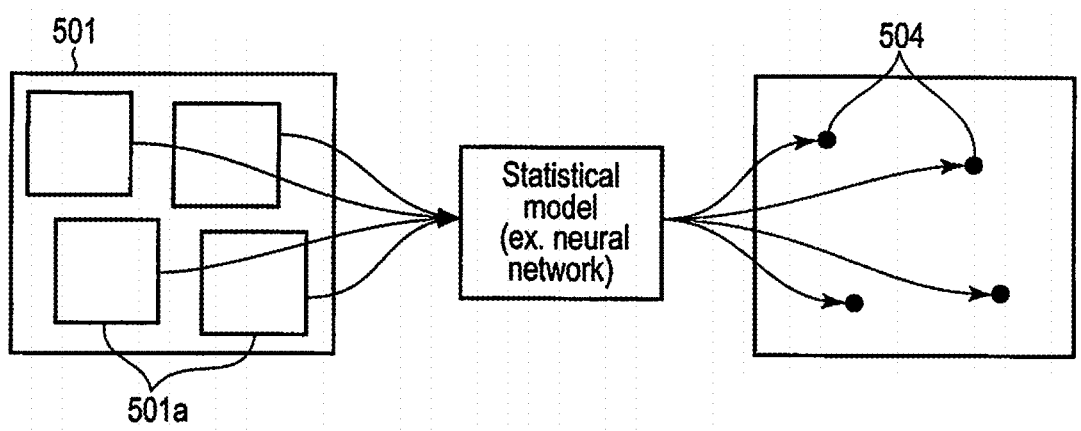
FIG. 11 is shown for explaining a first method for estimating a distance from a captured image.

The first method is explained with reference to FIG. 11. In the first method, the distance acquisition module 33 extracts a local area (image patch) 501a from the captured image 501.

In this case, for example, the entire area of the captured image 501 may be divided into a matrix, and the partial areas after the division may be extracted in series as the local areas 501a. Alternatively, the captured image 501 may be recognized, and the local areas 501a may be extracted to cover the area in which the subject (image) is detected. A local area 501a may partially overlap with another local area 501a.

The distance acquisition module 33 inputs information related to each extracted local area 501a (information of the captured image 501) to a statistical model. In this way, the distance acquisition module 33 estimates the distance 504 to the subject in each local area 501a.

Thus, the statistical model to which information related to each local area 501a is input estimates the distance for each of the pixels included in the local area 501a.

For example, when a particular pixel belongs to both a first local area 501a and a second local area 501a (in other words, when the first local area 501a overlaps with the second local area 501a with regard to the area including the pixel), the distance estimated by considering that the pixel belongs to the first local area 501a may be different from the distance estimated by considering that the pixel belongs to the second local area 501a.

Thus, for example, as described above, when a plurality of local areas 501a which partially overlap with each other are extracted, the distance of the pixels included in the area in which the local areas 501a overlap with each other may be the mean value of the distance estimated with regard to a part (pixel) of one of the overlapping local areas 501a and the distance estimated with regard to a part (pixel) of the other local area 501a. When three or more local areas 501a which partially overlap with each other are extracted, the distance of the pixels included in the area in which the three or more local areas 501a overlap with each other may be determined by the rule of majority by the distances estimated for the parts of the three or more overlapping local areas 501a.

Figure 12:
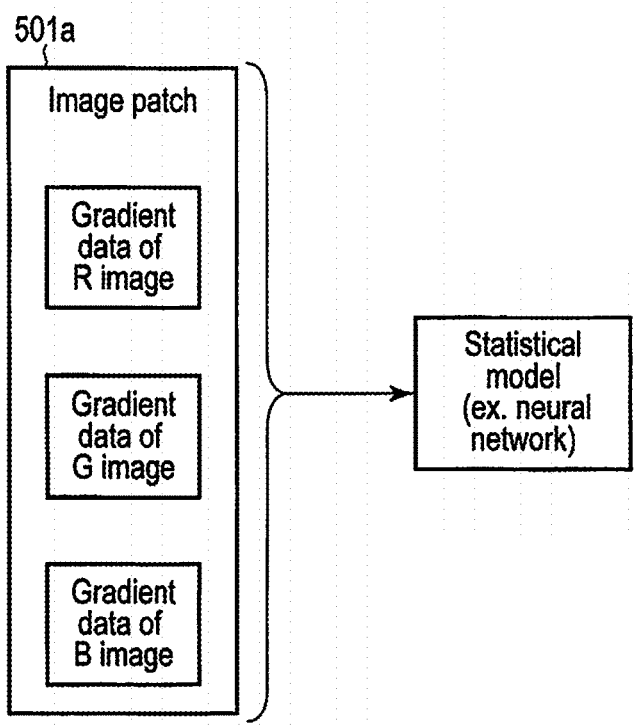
FIG. 12 shows an example of information input to a statistical model in the first method.

FIG. 12 shows an example of information related to each local area 501a input to the statistical model in the above first method.

The distance acquisition module 33 generates the gradient data of each local area 501a extracted from the captured image 501 with regard to each of the R image, G image and B image included in the captured image 501 (specifically, the gradient data of an R image, the gradient data of a G image and the gradient data of a B image). The gradient data generated by the distance acquisition module 33 in this manner is input to the statistical model.

The gradient data indicates the difference (difference value) of the pixel value between each pixel and its adjacent pixel. For example, when each local area 501a is extracted as a rectangular area of n pixels (X-axis direction)×m pixels (Y-axis direction), gradient data in which the difference values calculated with respect to the respective pixels included in the local area 501a from, for example, the respective adjacent pixels on the right are arranged in a matrix shape of n rows×m columns is generated.

The statistical model uses the gradient data of an R image, the gradient data of a G image and the gradient data of a B image and estimates the distance based on the bokeh produced in each image. FIG. 12 shows a case where the gradient data of each of an R image, a G image and a B image is input to the statistical model. However, the gradient data of the captured image 501 (RGB image) may be input to the statistical model.

Figure 13:
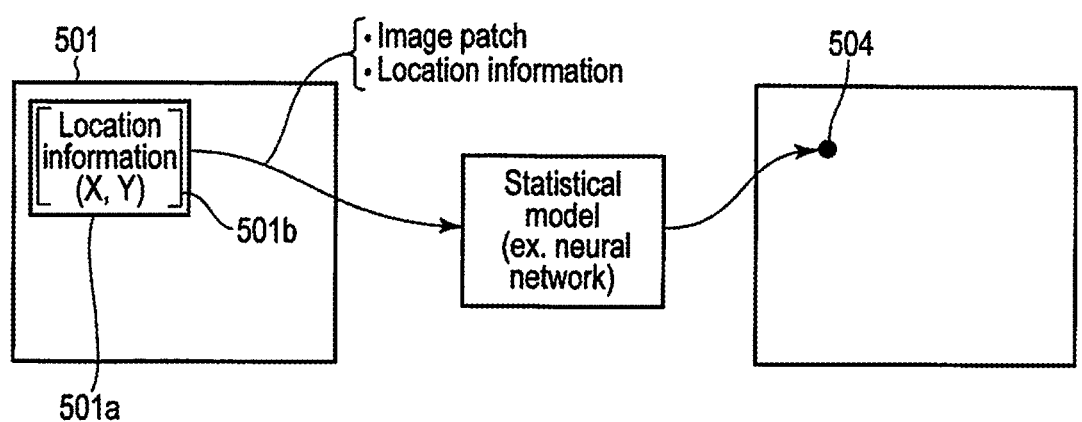
FIG. 13 is shown for explaining a second method for estimating a distance from a captured image.

Now, this specification explains the second method with reference to FIG. 13. In the second method, as information related to each local area 501a in the first method, the gradient data of the local area (image patch) 501a and the location information of the local area 501a in the captured image 501 are input to the statistical model.

For example, the location information 501b may indicate the center point of the local area 501a, or indicate a predetermined side such as an upper left side. As the location information 501b, the location information of each of the pixels included in the local area (image patch) 501a on the captured image 501 may be used.

By further inputting the location information 501b to the statistical model as described above, for example, when the bokeh of the subject image formed by the light passing through the middle portion of the lens 21 is different from the bokeh of the subject image formed by the light passing through the end portion of the lens 21, the effect caused by the difference to the estimation of the distance can be eliminated.

Thus, in the second method, the distance can be more assuredly estimated from the captured image 501 based on the correlation of bokeh, the distance and the position on the image.

FIG. 14 shows an example of information related to each local area 501a and input to the statistical model in the above second method.

For example, when a rectangular area of n pixels (X-axis direction)×m pixels (Y-axis direction) is extracted as a local area 501a, the image acquisition module 32 obtains a X-coordinate value (X-coordinate data) on the captured image 501 corresponding to, for example, the center point of the local area 501a and a Y-coordinate value (Y-coordinate data) on the captured image 501 corresponding to, for example, the center point of the local area 501a. This data is input to the distance acquisition module 33.

In the second method, the X-coordinate data and the Y-coordinate data generated by the distance acquisition module 33 in this manner are input to the statistical model together with the above gradient data of an R image, a G image and a B image.

The third method is further explained with reference to FIG. 15. The third method is different from the above first and second methods, and in the third method, the local areas (images patches) 501a are not extracted from the captured image 501. In the third method, the distance acquisition module 33 inputs information related to the entire area of the captured image 501 (the gradient data of an R image, a G image and a B image) to the statistical model.

In comparison with the first and second methods which estimate the distance 504 for each local area 501a, in the third method, the uncertainty of estimation by the statistical model might be increased. However, the load on the distance acquisition module 33 can be reduced.

In the following explanation, the information input to the statistical model in the above first to third methods is referred to as information related to an image for convenience sake.

FIG. 16 shows an example of the learning method of the statistical model in the present embodiment. Here, the learning of the statistical model using an image captured by the capture device 2 is explained. However, the learning of the statistical model may be performed using an image captured by, for example, another device (a camera, etc.,) including an optical system similar to the optical system of the capture device 2.

In the above explanation, an image captured by the capture device 2 to obtain distance information is referred to as a captured image. In the present embodiment, an image used by the statistical model to learn bokeh changing nonlinearly in accordance with the distance is referred to as a learning image for convenience sake.

When any of the first method explained with reference to FIG. 11, the second method explained with reference to FIG. 13 and the third method explained with reference to FIG. 15 is used, the learning of the statistical model is performed basically by inputting information related to a learning image 601 to the statistical model and feeding back the difference between the distance (distance information) 602 estimated by the statistical model and the correct value 603 to the statistical model. Feeding back refers to updating the parameter (for example, the weight coefficient) of the statistical model to decrease the difference.

When the first method is adopted as the above method for estimating the distance based on a captured image, in the learning of the statistical model, similarly, information related to each of the local areas (image patches) extracted from the learning image 601 (gradient data) is input to the statistical model. The distance 602 of each pixel in each local area is estimated by the statistical model. The difference obtained by comparing the estimated distance 602 with the correct value 603 is fed back to the statistical model.

When the second method is adopted as the above method for estimating the distance based on a captured image, in the learning of the statistical model, similarly, gradient data and location information are input to the statistical model as information related to each of the local areas (image patches) extracted from the learning image 601. The distance 602 of each pixel in each local area is estimated by the statistical model. The difference obtained by comparing the estimated distance 602 with the correct value 603 is fed back to the statistical model.

When the third method is adopted as the method for estimating the distance based on a captured image, in the learning of the statistical model, similarly, information related to the entire area of the learning image 601 (gradient data) is input to the statistical model in block. The distance 602 of each pixel in the learning image 601 is estimated by the statistical model. The difference obtained by comparing the estimated distance 602 with the correct value 603 is fed back to the statistical model.

The statistical model of the present embodiment is generated (prepared) by repeating leaning using images captured while the distance from the capture device 2 to a subject is changed in a state where the focus position (focal length) is fixed. When the learning of a focus position is completed, another focus position is learned in a similar manner. In this way, a statistical model with higher accuracy can be generated. This statistical model is stored in the statistical model storage 31 included in the image processing device 3, and is used to obtain distance information from a captured image.

Figure 17:
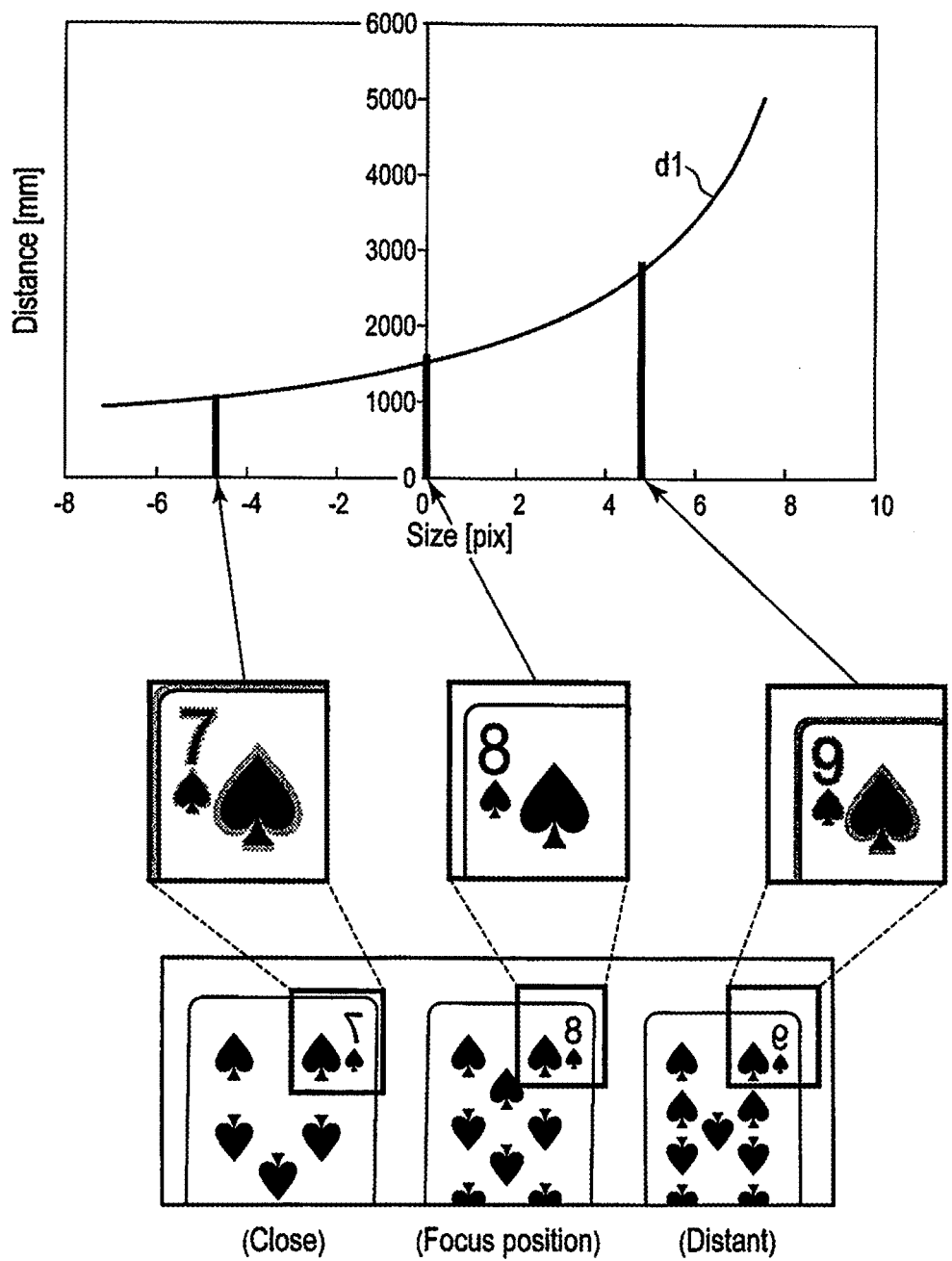
FIG. 17 is shown for specifically explaining the distance to a subject estimated from an image.

With reference to FIG. 17, this specification explains the details of the distance to a subject estimated from an image (a captured image or a learning image).

In FIG. 17, the size of the bokeh produced when the subject is closer to the capture device 2 than the focus position (on the capture device 2 side) is indicated by a negative number on the X-axis. The size of the bokeh produced when the subject is more distant from the capture device 2 than the focus position (on the rear side) is indicated by a positive number on the X-axis. Thus, in FIG. 17, the color and size of bokeh are indicated by negative and positive numbers.

FIG. 17 shows that the absolute value of the size (pixel) of bokeh is greater as the subject is more distant from the focus position both when the position of the subject is closer to the capture device 2 than the focus position and when the position of the subject is more distant from the capture device 2 than the focus position.

The example of FIG. 17 assumes a case where the focus position in the optical system which captured an image is approximately 1500 mm. In this case, for example, bokeh of approximately −4.8 pixels corresponds to a distance of approximately 1000 mm from the optical system. Bokeh of 0 pixels corresponds to a distance of 1500 mm from the optical system. Bokeh of approximately 4.8 pixels corresponds to a distance of approximately 750 mm from the optical system.

Here, for convenience sake, the size (pixel) of bokeh is indicated on the X-axis. However, as explained in the above FIG. 6 to FIG. 8, the shape of the bokeh (PSF shape) produced in an image also differs depending on whether the subject is closer to the capture device 2 than the focus position or more distant from the capture device 2 than the focus position. Thus, the value indicated on the X-axis in FIG. 17 may be a value of a reflection of the shape of bokeh (PSF shape).

When information related to a learning image is input to a statistical model in the learning of the statistical model, a positive or negative number (hereinafter, referred to as a bokeh value) indicating the color, size and shape of bokeh corresponding to the actual distance to the subject at the time of capturing the learning image is used as a correct value. According to the statistical model in which the above learning is performed, the above bokeh value is output as the distance to the subject in an image.

For example, as indicated by line segment d1 of FIG. 17, the distance to the subject correlates with the color and size (and the shape) of bokeh. Therefore, the estimation of the distance is a synonym for the estimation of the color, size and shape of bokeh.

The estimation by a statistical model can be more accurate when the statistical model estimates the color, size and shape of bokeh than when the statistical model directly estimates the distance. For example, when information related to each local area of n pixels (X-axis direction)×m pixels (Y-axis direction) is input to a statistical model, the statistical model outputs a distance in which the color, size and shape of bokeh (specifically, bokeh values indicating the color, size and shape of bokeh) estimated for the respective pixels included in the local area are arranged in an array of n rows×m columns.

In the learning of a statistical model, a learning image obtained by capturing a subject at each distance with as fine granularity as possible from the lower limit (the capture device 2 side) to the upper limit (the rear side) of the distance which can be obtained (estimated) in the image processing device 3 is prepared. Information related to these learning images is input to the statistical model. As a correct value used in the learning of the statistical model, a bokeh value indicating the color, size and shape of bokeh corresponding to the distance to the subject at the time of capturing each of the above learning images is used. For the learning of the statistical model, various learning images of different subjects should be preferably prepared.

Now, with reference to the flowchart of FIG. 18, this specification explains the processing procedure for generating the statistical model used in the image processing device 3 according to the present embodiment. The process shown in FIG. 18 may be performed in either, for example, the image processing device 3 or another device.

Information related to a learning image prepared in advance is input to a statistical model (step S1). For example, the learning image is generated by the image sensor 22 based on the light which passed through the lens 21 provided in the capture device 2, and is affected by the aberration of the optical system (lens 21) of the capture device 2. Specifically, the learning image has bokeh which changes nonlinearly in accordance with the distance to the subject as explained in the above FIG. 4 to FIG. 8.

It is assumed that the image processing device 3 or another device performing the process shown in FIG. 18 knows the information of the optical system which captures the leaning image (for example, the size of the aperture of the diaphragm mechanism). The information correlates with the bokeh produced in the learning image.

When the above first method is applied as the method for estimating the distance based on a captured image, as the information related to a learning image, the gradient data of an R image, a G image and a B image is input to the statistical model for each local area of the learning image.

When the above second method is applied as the method for estimating the distance based on a captured image, as the information related to a learning image, the gradient data of an R image, a G image and a B image and the location information of each local area of the learning image on the learning image are input to the statistical model for each local area.

When the above third method is applied as the method for estimating the distance based on a captured image, as the information related to a learning image, the gradient data of an R image, a G image and a B image for the entire area of the learning image is input to the statistical model.

In the present embodiment, this specification explains that the gradient data of an R image, a G image and a B image is input to the statistical model. However, when the distance is estimated in terms of the shape (SPF shape) of the bokeh produced in a learning image as described above, the gradient data of at least one of an R image, a G image and a B image should be input to the statistical model. When the distance is estimated in terms of the color and size of the bokeh produced in a learning image by chromatic aberration, the gradient data of at least two of an R image, a G image and a B image should be input to the statistical model.

When the information related to a learning image is input to the statistical model, the distance to the subject is estimated by the statistical model (step S2). In this case, the bokeh produced in the learning image is extracted from the learning image by the statistical model. A distance corresponding to the bokeh is estimated.

The distance estimated in step S2 is compared with the correct value obtained when the learning image is captured (step S3).

The result of comparison (difference) in step S3 is fed back to the statistical model (step S4). In this way, in the statistical model, the parameter is updated to decrease the difference (in other words, the bokeh produced in the learning image is learned).

By repeating the process shown in FIG. 18 for each learning image, a statistical model which learned bokeh changing nonlinearly in accordance with the distance to the subject in each learning image is generated. The statistical model generated in this manner is stored in the statistical model storage 31 included in the image processing device 3.

With reference to the flowchart shown in FIG. 19, this specification explains an example of the processing procedure of the image processing device 3 when distance information is obtained from a captured image.

The capture device 2 (image sensor 22) captures an image of a subject, and thus, generates the captured image including the subject. The captured image is affected by the aberration of the optical system (lens 21) of the capture device 2 as described above.

It is assumed that the image processing device 3 knows the information of the optical system of the capture device 2 which captures the captured image (for example, the size of the aperture of the diaphragm mechanism). The information correlates with the bokeh produced in the captured image.

The image acquisition module 32 included in the image processing device 3 obtains the captured image from the capture device 2 (step S11).

Subsequently, the distance acquisition module 33 inputs the information related to the captured image obtained in step S11 to the statistical model stored in the statistical model storage 31 (the statistical model learned in advance by performing the process shown in FIG. 18) (step S12). The process of step S12 is similar to that of step S1 shown in the above FIG. 18. Therefore, the detailed explanation thereof is omitted here.

When the process of step S12 is performed, the distance to the subject is estimated in the statistical model. The statistical model outputs the estimated distance. The distance to the subject is estimated and output for each of the pixels included in the captured image. In this way, the distance acquisition module 33 obtains the distance information indicating the distance output from the statistical model (step S13).

After the process of step S13 is performed, for example, the output module 34 outputs the distance information obtained in step S13 in a map form in which the distance information is positionally associated with the captured image 501 (step S14). In the present embodiment, this specification mainly explains that the distance information is output in a map form. However, the distance information may be output in another form.

As described above, in the present embodiment, a statistical model generated by learning bokeh which is produced in a learning image (first image) affected by the aberration of the optical system and changes nonlinearly in accordance with the distance to the subject in the image is stored in the statistical model storage 31 in advance. When a captured image affected by the aberration of the optical system is obtained, the captured image is input to the statistical model. In this way, distance information indicating the distance to the subject in the captured image is obtained.

In the present embodiment, the bokeh which changes nonlinearly in accordance with the distance to a subject in an image includes, for example, at least one of the bokeh produced by the chromatic aberration of the optical system and the bokeh produced in accordance with the size or shape of the aperture of the diaphragm mechanism for adjusting the amount of light taken into the optical system. In the present embodiment, this specification mainly explains only chromatic aberration as the aberration of the optical system.

However, the statistical model used in the present embodiment may learn the bokeh produced by another type of aberration (in other words, may obtain distance information based on the bokeh produced by another type of aberration). In the present embodiment, for example, the distance can be estimated by the monochromatic aberration produced in a monochromatic image. However, the accuracy of estimation of the distance can be improved with a color image having chromatic aberration.

In the present embodiment, as the distance to a subject in an image correlates with the bokeh produced in the image, the bokeh (bokeh information) which changes in accordance with the distance is extracted from a captured image and a distance corresponding to the bokeh can be estimated using a statistical model.

In the present embodiment, the distance to a subject in a captured image is estimated by a statistical model which performs learning (deep learning), noting bokeh changing nonlinearly in accordance with the distance to a subject in an image affected by the aberration of the optical system (lens 21) as described above. Thus, distance information indicating the estimated distance can be obtained.

For example, the distance may be estimated, using a statistical model which performs leaning with the bokeh information and semantic information of the entire image. However, in this case, specific bokeh information cannot be used. Further, a large amount of learning data is needed so that the environment can have robustness (in other words, the distance can be estimated from various captured images with high accuracy).

In the present embodiment, a statistical model learns only bokeh produced in an image. Therefore, in comparison with the above case where learning is performed with bokeh information and semantic information, the robustness at the time of obtaining the distance (distance information) from a captured image can be improved (in other words, a high robustness can be realized).

In a structure, a filter may be provided in the aperture of a monocular camera (in other words, a process is applied to the lens of the camera) to estimate the distance with the camera. However, in this structure, the light transmittance is decreased by the filter, and the color is easily unbalanced. Further, the cost is high as the number of components of the filter, etc., is increased.

In the present embodiment, the light transmittance is not decreased, and the color is balanced. Further, the cost is not increased.

In the present embodiment, when a statistical model learns bokeh for each local area extracted from an image, a statistical model which can estimate the distance with high accuracy from a captured image can be generated. In this case, by inputting information related to each local area extracted from a captured image to a statistical model, distance information indicating the distance to a subject in each local area can be obtained.

Information related to a local area includes, for example, information indicating the difference of the pixel value between each of the pixels included in the local area and its adjacent pixel. However, another type of information may be used as information related to a local area.

Specifically, as information related to a local area, the location information of the local area in an image may be further input to the statistical model. In this configuration, distance information with higher accuracy can be obtained in consideration of the position of the local area. The location information is, for example, information indicating the coordinates of the center point of the local area on a captured image. However, the local information may be another type of information.

In the above description, this specification explains a case where a statistical model learns bokeh for each local area extracted from an image. However, when a statistical model learns bokeh for the entire area of a learning image in block, inputs bokeh for the entire area of a captured image and estimates the distance, the calculation load on the image processing device 3 (distance acquisition module 33), etc., can be reduced.

In the present embodiment, a statistical model is explained as, for example, a neural network or random forests. However, another type of algorithm may be applied.

Now, this specification explains the image processing device 3 according to an example of a modification of the present embodiment. In the following explanation, the same portions as the above drawings used in the explanation of the present embodiment are denoted by like reference numbers, detailed description thereof being omitted. Portions different from those of the present embodiment are mainly explained.

Figure 20:
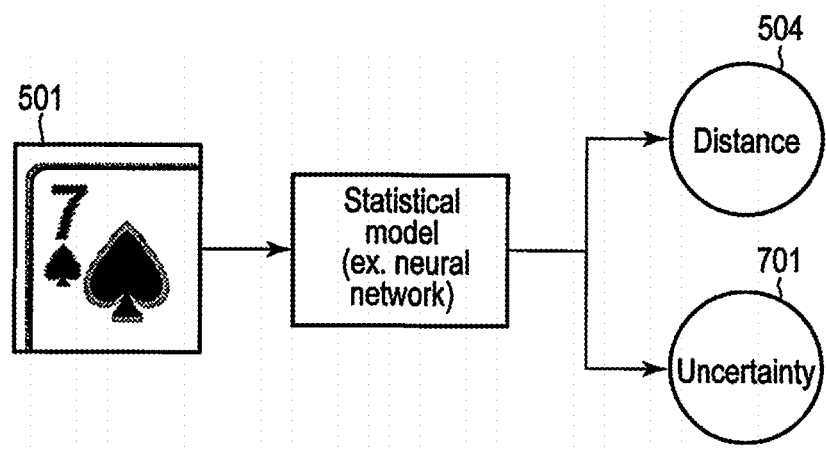
FIG. 20 is shown for explaining the outline of a modification of the present embodiment.

This specification explains the outline of the modification with reference to FIG. 20. As shown in FIG. 20, in the present modification, when the statistical model estimates the distance 504 from information related to the captured image 501, the statistical model calculates the uncertainty 701 of the estimation for each pixel and outputs the uncertainty 701 together with the distance 504. The calculation method of the uncertainty 701 is not limited to a specific method. Various known methods can be applied.

In the present modification, the distance acquisition module 33 examines the uncertainty output from the statistical model. When the uncertainty is greater than or equal to a threshold, for example, the distance acquisition module 33 discards the obtained distance information (in other words, the distance information indicating the distance in which the uncertainty is greater than or equal to the threshold). Distance information is output such that the distance information is arranged at a position corresponding to the pixel in which the distance indicated by the distance information is estimated (in other words, in a map form). When distance information is discarded, for example, a value indicating that the distance (distance information) estimated by the statistical model is invalid is arranged at a position corresponding to the pixel in which the distance is estimated.

When the uncertainty for the distance estimated for a specific pixel is greater than or equal to the threshold, the distance acquisition module 33 is capable of correcting the distance, using the distance estimated for pixels around the specific pixel (in other words, the distance in which the uncertainty is less than the threshold). In this correction, for example, the mean value of the distance estimated for surrounding pixels may be the correction value. The correction value may be determined by majority decision by the distance.

Figure 21:
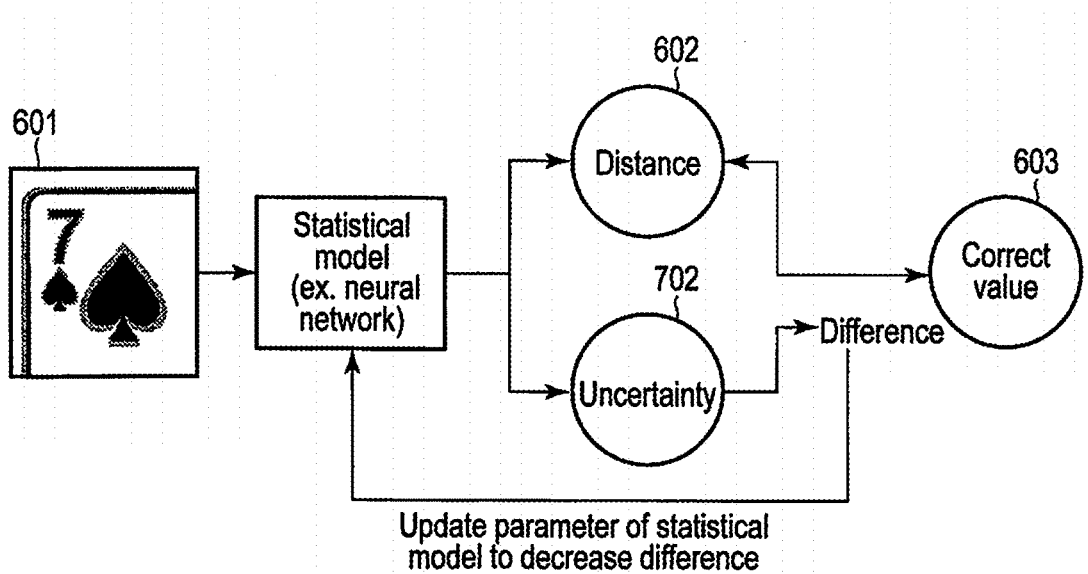
FIG. 21 shows an example of the learning method of a statistical model.

FIG. 21 shows an example of the learning method of the statistical model in the present modification. As shown in FIG. 21, in the present modification in which the statistical model outputs the uncertainty, basically, information related to the learning image 601 is input to the statistical model, and the difference between the distance 602 estimated by the statistical model and the correct value 603 is fed back to the statistical model. However, in the statistical model to which the information related to the learning image 601 is input, as described above, the uncertainty 702 for the estimated distance 602 is calculated. Thus, in the present modification, a difference obtained by dividing the difference between the distance 602 and the correct value 603 by the square of the uncertainty 702 is fed back. In this case, when the uncertainty 702 is infinite, the difference is zero. Thus, the square of the uncertainty 702 is added to the difference as a penalty.

In the present modification, the parameter (for example, the weight coefficient) of the statistical model is updated to decrease the value obtained by correcting the difference between the distance 602 and the correct value 603 with the uncertainty 702.

For example, when the uncertainty 702 is high while there is no difference between the distance 602 estimated by the statistical model and the correct value 603, the distance 602 is presumed to be estimated by accident. In this case, it is possible to recognize that the learning of the distance 602 (correct value 603) is insufficient.

In the present modification, this deviation in learning can be reduced by using the uncertainty calculated by the statistical model.

Now, this specification explains the operation of the image processing device 3 of the present modification. The process for generating the statistical model used in the image processing device 3 of the present modification is the same as the process shown in the above FIG. 18 except that the difference corrected with the uncertainty is used as described above. Thus, the detailed explanation thereof is omitted.

With reference to the flowchart shown in FIG. 22, this specification explains the processing procedure of the image processing device 3 when distance information is obtained from a captured image.

The processes of steps S21 and S22 equivalent to the processes of steps S11 and S12 shown in the above FIG. 19 are performed.

In the present modification, when the process of step S22 is performed, the statistical model estimates the distance to a subject and calculates the uncertainty for the distance. The distance to a subject and the uncertainty are output from the statistical model for each of the pixels included in the captured image.

Accordingly, the distance acquisition module 33 obtains the distance information indicating the distance and the uncertainty output from the statistical model for each of the pixels included in the captured image (step S23).

Subsequently, the processes of steps S24 and S25 are performed for each distance information item obtained in step S23 (in other words, distance information for each pixel). In the following explanation, the distance information to be processed in steps S24 and S25 is referred to as the target distance information. The uncertainty for the distance indicated by the target distance information is referred to as the target uncertainty. Further, the pixels included in the captured image in which the distance indicated by the target distance information is estimated (output) in the statistical model are referred to as the target pixels.

In this case, the distance acquisition module 33 determines whether or not the target uncertainty is greater than or equal to a threshold (step S24).

When the distance acquisition module 33 determines that the target uncertainty is greater than or equal to the threshold (YES in step S24), the distance acquisition module 33 specifies, of the distance information for the pixels obtained in step S23, distance information indicating the distance estimated for the pixels located around the target pixels in the captured image (hereinafter, referred to as the surrounding pixels) in which the uncertainty for the indicated distance is less than the threshold. Here, either a plurality of distance information items or a single distance information item may be specified. The distance acquisition module 33 corrects the distance indicated by the target distance information, using the distance indicated by the specified distance information (step S25). When distance information in which the uncertainty is less than the threshold is not present in the distance information indicating the distance estimated for the surrounding pixels, the distance indicated by the target distance information is set to, for example, the indefinite value determined in advance.

When a plurality of distance information items are specified, the distance indicated by the target distance information may be corrected so as to be the mean value of the distance indicated by the distance information items (in other words, the distance estimated for the surrounding pixels), or may be corrected based on majority decision by the distance indicated by the distance information items. When a single distance information item is specified, the distance indicated by the target distance information should be corrected based on the distance indicated by the distance information item.

When the distance acquisition module 33 determines that the target uncertainty is not greater than or equal to the threshold (in other words, the target uncertainty is less than the threshold) (NO in step S24), the process of step S25 is not performed.

Subsequently, whether or not the processes of the above steps S24 and S25 are performed for all the distance information obtained in step S23 is determined (step S26).

When it is determined that the processes are not performed for all the distance information (NO in step S26), the procedure returns to step S24 to repeat the processes. In this case, the processes are performed such that the distance information to which the process of step S24 or S25 is not applied is the target distance information.

When it is determined that the processes are performed for all the distance information (YES in step S26), the process of step S27 equivalent to the process of step S14 shown in the above FIG. 19 is performed.

In the example shown in FIG. 22, this specification explains that the distance in which the uncertainty is greater than or equal to the threshold is corrected with the distance estimated for the surrounding pixels. However, the distance information indicating the distance in which the uncertainty is greater than or equal to the threshold may be discarded and may not be output by the output module 34.

As described above, in the present modification, by using the uncertainty calculated from a statistical model, it is possible to prevent the direct use of the distance in which the uncertainty is greater than or equal to a threshold (in other words, the distance which is presumed to be estimated incorrectly as the uncertainty is high).

APPLICATION EXAMPLES

Now, this specification explains application examples to which the ranging system 1 having the structures of the above embodiment and modification is applied. Here, for convenience sake, this specification explains a case where the ranging system 1 is realized as a single device (ranging device) including a capture unit equivalent to the capture device 2 shown in FIG. 1 and an image processor equivalent to the image processing device 3. In the following drawings, this specification assumes that the ranging device 1 includes the capture unit 2 and the image processor 3.

FIG. 23 shows an example of the functional configuration of a mobile object 800 into which the ranging device 1 is incorporated. The mobile object 800 can be realized as, for example, an automobile, an unmanned aerial vehicle or an autonomous mobile robot including an automated driving function. The unmanned aerial vehicle is an airplane, rotorcraft, glider or airship which cannot carry people. The unmanned aerial vehicle can be flown by remote control or automatic driving, and includes, for example, a drone (multicopter), a radio control device and a helicopter for pesticide spraying. The autonomous mobile robot includes a mobile robot such as an automated guided vehicle (AGV), a cleaning robot for cleaning floors, a communication robot which guides visitors in various ways, etc. The mobile object 800 is not limited to a robot in which the main body moves. The mobile object 800 includes an industrial robot including a drive mechanism which moves or rotates part of the robot, such as a robotic arm.

As shown in FIG. 23, the mobile object 800 includes, for example, the ranging device 1, a control signal generator 801 and a drive mechanism 802. The capture unit 2 provided in the ranging device 1 is set so as to capture an image of a subject in the travel direction of the mobile object 800 or part of the mobile object 800.

As shown in FIG. 24, when the mobile object 800 is an automobile 800A, the capture unit (capture device) 2 is set as a front camera which captures an image of the front side. The capture unit 2 may be set as a rear camera which captures an image of the rear side when the automobile is backed. A plurality of capture units 2 may be set as a front camera and a rear camera. Further, the capture unit 2 may also function as a dashboard camera. Thus, the capture unit 2 may be a video recorder.

Figure 25:
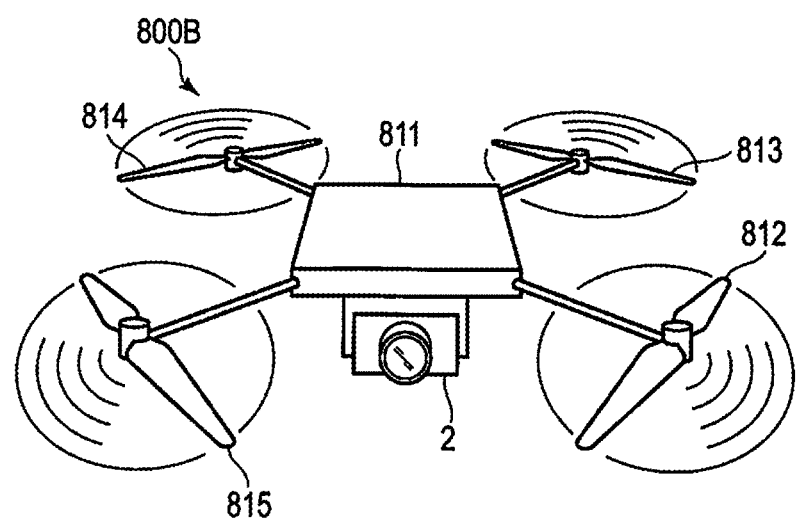
FIG. 25 is shown for explaining a case where the mobile object is a drone.

FIG. 25 shows an example when the mobile object 800 is a drone 800B. The drone 800B includes a drone main body 811 equivalent to the drive mechanism 802, and four propeller units 812 to 815. Each of the propeller units 812 to 815 includes a propeller and a motor. When the drive of each motor is transferred to a corresponding propeller, the propellers are rotated. By the lift of the rotation, the drone 800 is flown. The capture unit 2 (ranging device 1) is mounted in, for example, the lower part of the drone main body 811.

Figure 26:
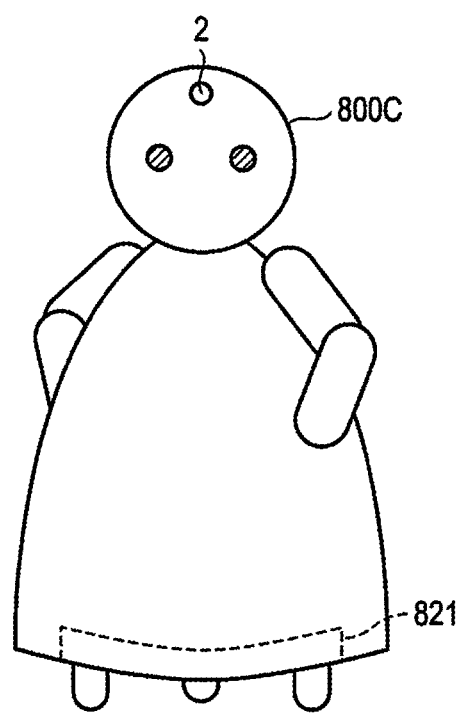
FIG. 26 is shown for explaining a case where the mobile object is an autonomous mobile robot.

FIG. 26 shows an example when the mobile object 800 is an autonomous mobile robot 800C. A power unit 821 equivalent to the drive mechanism 802 and including a motor, a wheel, etc., is provided in the lower part of the mobile robot 800C. The power unit 821 controls the number of revolutions of the motor and the direction of the wheel. In the mobile robot 800C, the wheel set on the road surface or floor surface is rotated when the drive of the motor is transferred. As the direction of the wheel is controlled, the mobile robot 800C is capable of moving in an arbitrary direction. In the example shown in FIG. 26, for example, the capture unit 2 is provided in the head of the mobile humanoid robot 800C so as to capture an image of the front side of the mobile robot 800C. The capture unit 2 may be provided so as to capture an image of the rear side or left and right sides of the mobile robot 800C. A plurality of capture units 2 may be provided so as to capture an image of a plurality of directions. The capture unit 2 may be provided in a compact robot which has a small space for mounting a sensor, etc., to estimate the self-position, the posture and the position of a subject and conduct dead reckoning.

Figure 27:
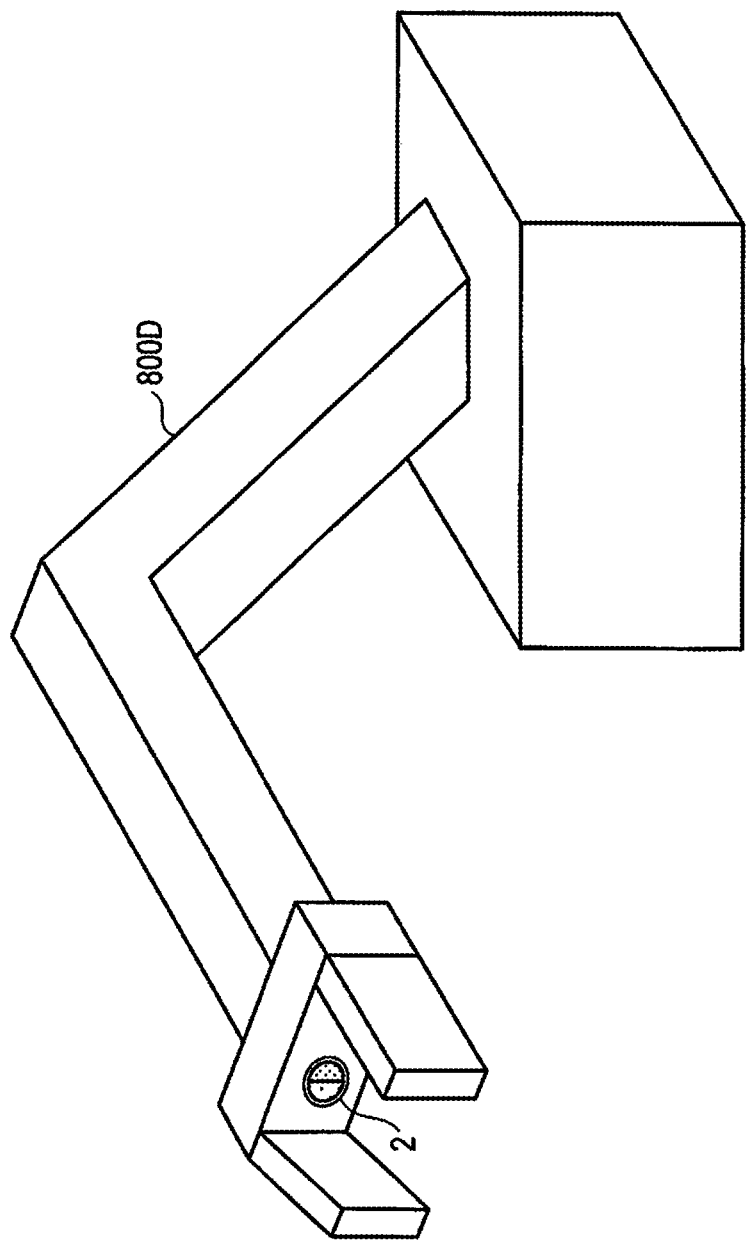
FIG. 27 is shown for explaining a case where the mobile object is a robotic arm.

When the mobile object 800 is a robotic arm 800D as shown in FIG. 27, and the move and rotation of part of the robotic arm 800D are controlled, the capture unit 2 may be provided at, for example, the leading end of the robotic arm 800D. In this case, the capture unit 2 captures an image of the object to be held by the robotic arm 800D. The image processor 3 is capable of estimating the distance to the object to be held by the robotic arm 800D. This structure enables the robotic arm 800D to accurately hold the object.

The control signal generator 801 outputs a control signal for controlling the drive mechanism 802 based on the distance information output from the ranging device 1 (image processor 3) and indicating the distance to a subject. The drive mechanism 802 drives the mobile object 800 or part of the mobile object 800 by the control signal output from the control signal generator 801. For example, the drive mechanism 802 performs at least one of the move, the rotation, the acceleration, the deceleration, the adjustment of thrust (lift), the change in the travel direction, the switching between a normal operation mode and an automatic operation mode (crash avoidance mode) and the operation of a safety device such as an air-bag of the mobile object 800 or part of the mobile object 800. For example, when the distance to a subject is less than a threshold, the drive mechanism 802 may perform at least one of the move, the rotation, the acceleration, the adjustment of thrust (lift), the change to a direction approaching the object, and the switching from an automatic operation mode (crash avoidance mode) to a normal operation mode.

The drive mechanism 802 of the automobile 800A shown in FIG. 24 is, for example, a tire. The drive mechanism 802 of the drone 800B shown in FIG. 25 is, for example, a propeller. The drive mechanism 802 of the mobile robot 800C shown in FIG. 26 is, for example, a leg portion. The drive mechanism 802 of the robotic arm 800D shown in FIG. 27 is, for example, a supporting portion which supports the leading end at which the capture unit 2 is provided.

The mobile object 800 may further include a speaker or display to which the information (distance information) output from the ranging device 1 and related to the distance to a subject is input. The speaker and the display are connected to the ranging device 1 with or without a line and are configured to output sound or an image related to the distance to a subject. Moreover, the mobile object 800 may include a light emitting unit. To the light emitting unit, the information output from the ranging device 1 and related to the distance to a subject may be input. The light emitting unit may be configured to be switched on and off in accordance with the distance to a subject.

When the mobile object 800 is the drone 800B, the drone 800B obtains an image of a subject captured by the capture unit 2 and determines whether or not the distance to the subject is greater than or equal to a threshold at the time of the preparation of a map (the three-dimensional shape of an object), the structural survey of a building or geography or an inspection of cracks and breaks of electric cables from the above. The control signal generator 801 generates a control signal for controlling the thrust of the drone 800B based on the result of the determination such that the distance to the target to be inspected is constant. It is assumed that the thrust includes lift. As the drive mechanism 802 causes the drone 800B to operate based on the control signal, the drone 800B can be flown parallel to the target to be inspected. When the mobile object 800 is a drone for observation, a control signal for controlling the thrust of the drone such that the distance to the object to be observed is constant may be generated.

When the mobile object 800 (for example, the drone 800B) is used for the maintenance and inspection of various infrastructures (hereinafter, simply referred to as an infrastructure), the distance to the portion to be repaired in the infrastructure such as a crack portion or a rusted portion can be obtained by capturing an image of the portion to be repaired by the capture unit 2. In this case, the size of the portion to be repaired can be calculated from the image by using the distance to the portion to be repaired. In this structure, for example, when the portion to be repaired is displayed on a map showing the entire infrastructure, the inspector of the infrastructure can identify the portion to be repaired. If the inspector is informed of the size of the portion to be repaired in advance, this is effective to smoothly conduct maintenance and repairs.

When the drone 800B flies, the drone 8008 obtains an image captured by the capture device 2 in the ground direction, and determines whether or not the distance to the ground is greater than or equal to a threshold. The control signal generator 801 generates a control signal for controlling the thrust of the drone 800B based on the result of the determination such that the height from the ground is the specified height. As the drive mechanism 802 causes the drone 800B to operate based on the control signal, the drone 800B can be flown at the specified height. When the drone 800B is a drone for pesticide spraying, it is easy to evenly scatter pesticide by keeping the height of the drone 800B from the ground constant.

When the mobile object 800 is the automobile 800A or the drone 800B, the mobile object 800 obtains an image of an automobile on the front side or an adjacent drone captured by the capture unit 2 and determines whether or not the distance to the automobile or drone is greater than or equal to a threshold at the time of the cooperative running of the automobile 800A or the cooperative flying of the drone 800B. The control signal generator 801 generates a control signal for controlling the speed of the automobile 800A or the thrust of the drone 8008 based on the result of the determination such that the distance to the automobile on the front side or the adjacent drone is constant. As the drive mechanism 802 causes the automobile 800A or the drone 800B to operate based on the control signal, the cooperative running of the automobile 800A or the cooperative flying of the drone 808B can be easily performed.

Further, when the mobile object 800 is the automobile 800A, an instruction from the driver of the automobile 800A may be received via a user interface such that the driver can set (change) a threshold. In this structure, the driver can drive the automobile 800A, keeping a desired distance from another automobile. To keep a safe distance from the automobile ahead, a threshold may be changed in accordance with the speed of the automobile 800A. The safe distance from the automobile ahead changes depending on the speed of the automobile 800A. Thus, the threshold can be set so as to be greater (longer) as the automobile 800A is driven faster.

When the mobile object 800 is the automobile 800A, a predetermined distance in the travel direction may be set as the threshold. A control signal for causing brakes to operate or causing a safety device such as an air-bag to operate when an object emerges at a distance less than the threshold may be generated. In this case, a safety device such as an automatic braking device or an air-bag is provided in the drive mechanism 802.

According to at least one embodiment described above, it is possible to provide an image processing device, a ranging device and a method capable of improving robustness when a distance is obtained from an image.

Each of the various functions described in the embodiment and the modification may be realized by a circuit (processing circuit). For example, the processing circuit includes a programmed processor such as a central processing unit (CPU). The processor executes each described function by executing a computer program (a group of instructions) stored in a memory. The processor may be a microprocessor including an electric circuit. For example, the processing circuit includes a digital signal processor (DSP), an application specific integrated circuit (ASIC), a microcontroller, a controller and other electric circuit components. Each of the components described in the present embodiment other than the CPU may be also realized by a processing circuit.

Each process of the present embodiment can be realized by a computer program. Therefore, an effect similar to that of the present embodiment can be easily realized by merely installing the computer program on a computer through a computer-readable storage medium in which the computer program is stored and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
   storage which stores a statistical model generated by learning bokeh produced in a first image affected by aberration of an optical system, the bokeh changing nonlinearly in accordance with a distance to a subject in the first image, and
   a processor which
      obtains a second image affected by the aberration of the optical system, and
      inputs the second image to the statistical model and obtains distance information indicating a distance to a subject in the second image.

2. The image processing device of claim 1, wherein
   the bokeh changing nonlinearly in accordance with the distance to the subject in the first image comprises bokeh produced by the aberration of the optical system.

3. The image processing device of claim 1, wherein
   the bokeh changing nonlinearly in accordance with the distance to the subject in the first image comprises bokeh produced in accordance with a size or shape of an aperture of a diaphragm mechanism adjusting an amount of light taken into the optical system.

4. The image processing device of claim 1, wherein
   the statistical model is generated by learning only the bokeh changing nonlinearly in accordance with the distance to the subject in the first image.

5. The image processing device of claim 1, wherein
   the statistical model is generated by learning the bokeh changing nonlinearly in accordance with the distance to the subject in each of local areas in the first image.

6. The image processing device of claim 5, wherein
   the processor extracts a local area from the second image, inputs information related to the extracted local area to the statistical model, and obtains distance information indicating a distance to a subject in the local area.

7. The image processing device of claim 6, wherein
   the information input to the statistical model and related to the local area comprises information indicating a difference of a pixel value between each of pixels included in the local area and its adjacent pixel.

8. The image processing device of claim 6, wherein
   the information input to the statistical model and related to the local area comprises location information of the local area in the second image.

9. The image processing device of claim 8, wherein
   the location information comprises information indicating coordinates of a center point of the local area on the second image.

10. The image processing device of claim 1, wherein
    the statistical model comprises a neural network or random forests.

11. The image processing device of claim 1, wherein
    the statistical model extracts bokeh changing in accordance with a distance from the second image, and estimates a distance corresponding to the bokeh, and
    the processor obtains distance information indicating the estimated distance.

12. The image processing device of claim 1, wherein
    the statistical model estimates a distance to the subject for each of a plurality of pixels included in the second image, and calculates uncertainty for the estimated distance, and
    the processor obtains distance information indicating the estimated distance and the calculated uncertainty.

13. The image processing device of claim 12, wherein
    the processor discards, of the obtained distance information, distance information indicating a distance in which the calculated uncertainty is greater than or equal to a threshold.

14. The image processing device of claim 12, wherein
    the processor corrects a first distance indicated by the obtained distance information, using a second distance estimated for a pixel located around a pixel in which the first distance is estimated,
    uncertainty for the first distance is greater than or equal to a threshold, and
    uncertainty for the second distance is less than the threshold.

15. A ranging device comprising:
    a capture unit which captures an image,
    storage which stores a statistical model generated by learning bokeh produced in a first image affected by aberration of an optical system of the capture unit, the bokeh changing nonlinearly in accordance with a distance to a subject in the first image, and
    a processor which
       obtains a second image affected by the aberration of the optical system of the capture unit from the capture unit; and
       inputs the second image to the statistical model, and obtains distance information indicating a distance to a subject in the second image.

16. A method comprising:
    storing, in storage, a statistical model generated by learning bokeh produced in a first image affected by aberration of an optical system, the bokeh changing nonlinearly in accordance with a distance to a subject in the first image;
    obtaining a second image affected by the aberration of the optical system; and
    inputting the second image to the statistical model and obtaining distance information indicating a distance to a subject in the second image.

* * * * *